(12) United States Patent
Hasegawa

(10) Patent No.: US 9,125,526 B2
(45) Date of Patent: Sep. 8, 2015

(54) ROLLING MAT

(71) Applicant: HASEGAWA CORPORATION, Chiba (JP)

(72) Inventor: Toshikazu Hasegawa, Chiba (JP)

(73) Assignee: HASEGAWA CORPORATION, Chiba (JP)

( * ) Notice: Subject to any disclaimer, the term of this patent is extended or adjusted under 35 U.S.C. 154(b) by 0 days.

(21) Appl. No.: 14/402,825

(22) PCT Filed: Mar. 29, 2013

(86) PCT No.: PCT/JP2013/059477
§ 371 (c)(1),
(2) Date: Nov. 21, 2014

(87) PCT Pub. No.: WO2014/050176
PCT Pub. Date: Apr. 3, 2014

(65) Prior Publication Data
US 2015/0150418 A1    Jun. 4, 2015

(30) Foreign Application Priority Data

Sep. 28, 2012  (JP) .................................. 2012-215961

(51) Int. Cl.
*A47J 43/20* (2006.01)

(52) U.S. Cl.
CPC ........................................ *A47J 43/20* (2013.01)

(58) Field of Classification Search
CPC ....................................................... A47J 43/20
USPC .................. 426/297; 425/110, 383, 470, 472; 99/426, 450, 450.1–450.6; 220/9.2, 220/600
See application file for complete search history.

(56) References Cited

U.S. PATENT DOCUMENTS

| 4,674,967 | A | * | 6/1987 | Oseka | ........................... | 425/110 |
| 4,778,687 | A | * | 10/1988 | Kikuchi | ........................ | 426/412 |
| 5,009,905 | A | * | 4/1991 | Ikeda | ............................ | 426/297 |

(Continued)

FOREIGN PATENT DOCUMENTS

| JP | 61-271943 A | 12/1986 |
| JP | 63-134692 U | 9/1988 |

(Continued)

OTHER PUBLICATIONS

International Search Report for PCT Patent App. No. PCT/JP2013/059477 (Jul. 2, 2013).

(Continued)

*Primary Examiner* — Robert B Davis
(74) *Attorney, Agent, or Firm* — Cermak Nakajima & McGowan LLP; Tomoko Nakajima

(57) ABSTRACT

The present invention provides a rolling mat which is easy to roll, which is sanitary and which enables the right amount of force of pressing food material to be readily determined. A rolling mat includes: a plurality of rod-like rib parts arranged in a direction Y in which food material is rolled; and a knitted string part that connects the plurality of rib parts 12 with each other by knitting a string material part so as to sandwich the rib parts, wherein the rib parts are formed of a plastic material and/or a metal material having hardness that is at least greater than silicone resin, and the knitted string part is made of man-made monofilament fiber or high molecular weight polyethylene fiber produced by stretching polyethylene resin having a high molecular weight into fibers.

28 Claims, 14 Drawing Sheets

(56) References Cited

U.S. PATENT DOCUMENTS

D728,991 S * 5/2015 Hasegawa ................. D7/368
2005/0016389 A1 * 1/2005 Kobayashi ................. 99/450.1

FOREIGN PATENT DOCUMENTS

| JP | 02-124068 A | | 5/1990 |
|---|---|---|---|
| JP | 2004-201662 A | | 7/2004 |
| JP | 3113813 U | | 8/2005 |
| JP | 2009011297 A | * | 1/2009 |
| JP | 2012-065640 A | | 4/2012 |

OTHER PUBLICATIONS

English translation of International Preliminary Report on Patentability for PCT Patent App. No. PCT/JP2013/059477 (Dec. 27, 2013).

* cited by examiner

Fig. 17(a)
Fig. 17(b)
Fig. 17(c)
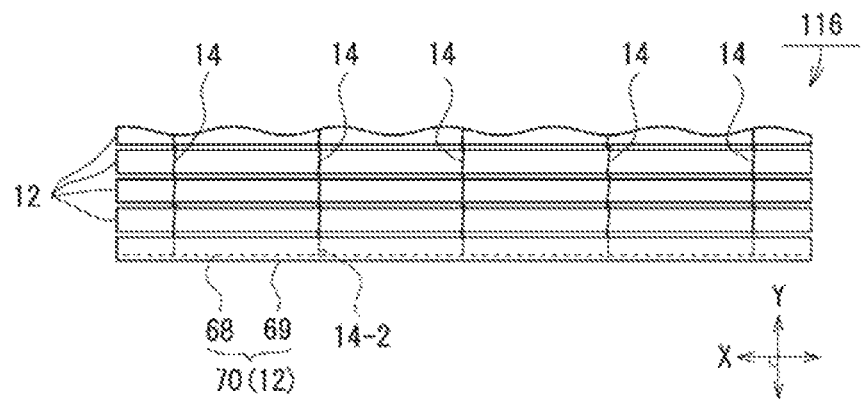
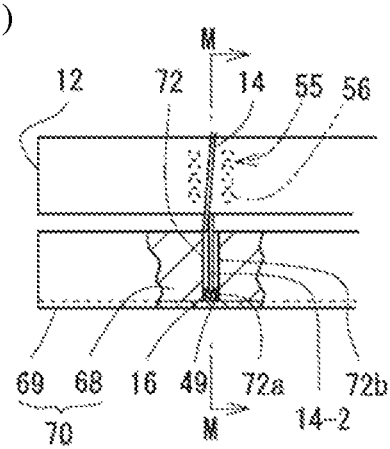
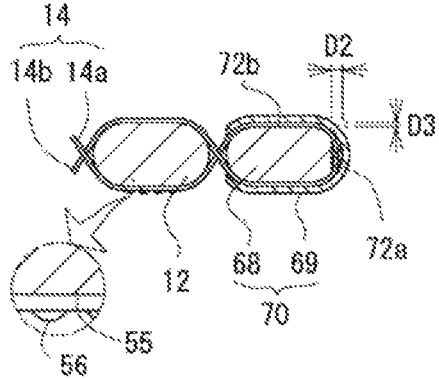
Fig. 17(d)
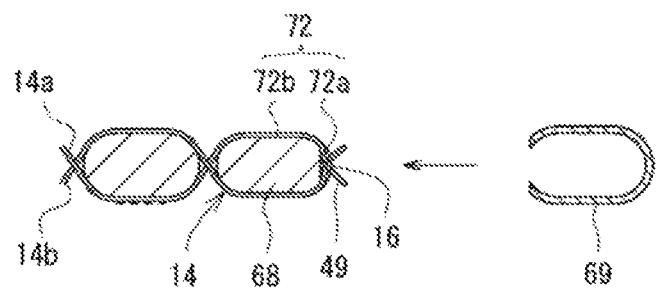

Fig. 18(a)
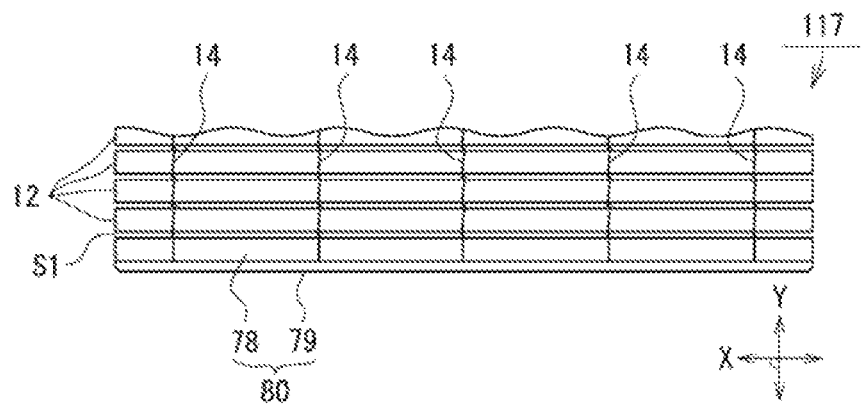
Fig. 18(b)
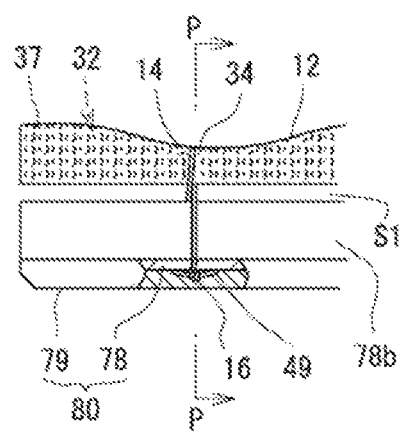
Fig. 18(c)
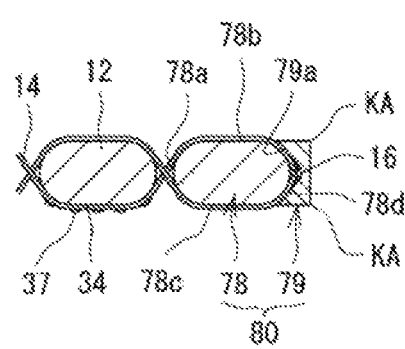
Fig. 18(d)
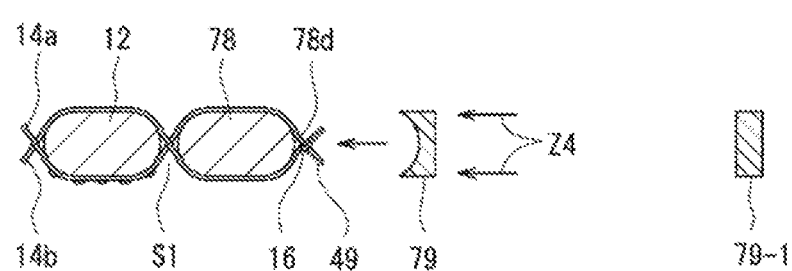
Fig. 18(e)

ROLLING MAT

This application is a national phase entry under 35 U.S.C. §371 of PCT Patent Application No. PCT/JP2013/059477, filed on Mar. 29, 2013, which claims priority under 35 U.S.C. §119 to Japanese Patent Application No. 2012-215961, filed Sep. 28, 2012, both of which are incorporated by reference.

TECHNICAL FIELD

The present invention relates to a rolling mat (makisu) for food preparation.

BACKGROUND FIELD

A rolling mat used in hand rolling operations of norimaki (vinegared rice rolled in dried seaweed), makizushi (sushi roll), datemaki (sweetened rolled omelet mixed with fish paste), and the like is formed in a bamboo screen shape. The rolling mat is generally constituted by a plurality of elongated rib parts juxtaposed in a direction in which a food material is rolled and a string material part for connecting the plurality of rib parts.

Conventionally, a bamboo material which has relatively high rigidity and a smooth surface is suitably used as the rib parts, and a twisted yarn of a cotton thread such as kite string which exhibits high flexibility and which enables necessary elongation is used as the string material part.

Since such a rolling mat comes into contact with food materials such as seaweed, rice grains, raw fish, tamagoyaki (Japanese style omelet), and the like, easiness of sanitation management is required. However, the bamboo material and cotton threads that form the rib parts and the string parts have the following problems. Bamboo material and cotton threads absorb moisture and are difficult to clean. In addition, with bamboo material and cotton threads, it is difficult to remove detergent and stains having penetrated therein, mold and bacteria growing inside, and the like. While mold, bacteria, and the like can be sterilized with hot water, hot water sterilization is likely to impair durability of the rolling mat. Furthermore, bamboo material has risks including being more susceptible to fine splits due to bamboo fibers and detached hangnails getting mixed into the food material. Moreover, while the rolling mat must be dried since a wet rolling mat dampens seaweed, since bamboo material and cotton threads require a long time to dry, cleaning can only be performed around once a day which is not satisfactory in terms of sanitation.

In consideration thereof, a rolling mat formed of plastic has recently been developed as described in Patent Document 1 as a countermeasure to such problems. The rolling tool (rolling mat) described in Patent Document 1 includes a plurality of rib materials having linear chevron cross sections and thinned parts between the plurality of rib materials, and the rib materials and the thinned parts are integrally formed of silicone rubber. In addition, since the silicone rubber is flexible, the rolling mat is advantageous in that it is easy to roll and is sanitarily favorable.

CONVENTIONAL ART DOCUMENTS

Patent Documents

Patent Document 1: Japanese Patent Application Laid-open No. 2004-201662

SUMMARY OF INVENTION

Problem to be Solved by the Invention

However, it was found that while the rolling mat according to Patent Document 1 is undeniably easy to roll, it is difficult to adjust the right amount of force for pressing down on food material when rolling or shaping makizushi or the like due to the silicone rubber forming the rolling mat being too soft. As a result, with the rolling mat according to Patent Document 1, for example, situations are likely to occur where rice grains end up being undesirably squashed due to the use of excessive force when rolling (overly compacted rice results in a decline in taste) or the makizushi loses its shape when held by chopsticks due to insufficient use of force when rolling. Furthermore, since the rib members are connected by thinned parts made of soft silicone rubber, there is a risk that premature breakage of the thinned parts may occur.

An object of the present invention is to provide a rolling mat which is easy to roll, which is sanitary, and which enables the right amount of force for pressing down on food material to be readily determined.

Means to Solve the Problem

The problems described above can be solved by a rolling mat including: a plurality of rod-like rib parts that are arranged in a direction in which food material is rolled; and a knitted string part that connects the plurality of rib parts with each other by knitting a string material part so as to sandwich the rib parts, wherein the rib parts are formed of a plastic material and/or a metal material having hardness that is at least greater than silicone resin, and the knitted string part is made of man-made monofilament fiber or high molecular weight polyethylene fiber produced by stretching polyethylene resin having a high molecular weight into fibers.

In other words, the rolling mat according to the present invention comprises a plurality of rod-like rib parts arranged in a direction in which food material is rolled, and a knitted string part that connects the plurality of rib parts with each other by knitting a string material part so as to sandwich the rib parts. For example, the knitted string part is knitted by arranging a first string material part on an upper surface of a rib part and arranging a second string material part on a lower surface of the rib part so as to sandwich the rib part and vertically crossing the string material parts between rib parts that are adjacent to one another. In addition, the plurality of rib parts are connected by fixing the string materials by tying or the like at positions of terminal rib parts that are arranged at ends in the rolling direction (a direction in which the plurality of rib parts are arranged; the same description shall apply hereinafter). In this manner, with the rolling mat according to the present invention, since the string material part having a string shape is knitted to connect the rib parts in a similar manner to a conventional rolling mat instead of integrally forming the entire rolling mat using resin, a rolling mat with a structure that is easy to roll can be produced even when using a string material part with high rigidity.

In addition, the rib parts are formed of a plastic material and/or a metal material and the knitted string part is also made of chemical fiber. As a result, compared to a conventional rolling mat constituted by bamboo material and cotton threads, the rib parts and the knitted string part are less likely to absorb moisture, stains, detergent, and the like, can be cleaned easily, can be dried easily due to the lack of moisture absorption, and internal growth of mold and bacteria can be suppressed. Furthermore, the number of cleaning and sterilization opportunities of the rolling mat can be increased. Moreover, since the rib parts do not create hangnails due to splitting of fiber unlike bamboo material, the risks of mixing of foreign objects into food material, injury, and the like can be eliminated. As described above, by combining the plastic and/or metal rib parts with the man-made string material part, sanitation management can be readily performed.

In addition, since the knitted string part is particularly made of monofilament fiber or high molecular weight polyethylene fiber produced by stretching polyethylene resin with a high molecular weight into fibers among chemical fibers, a tough rolling mat with greater durability and superior sanitary performance can be obtained as will be described later.

Specifically, a monofilament fiber is a solid single man-made fiber such as a fishline which have been found, as a result of testing, to have less elongation, higher strength, and greater durability as compared to twisted yarns produced by twisting together a plurality of fine strings. Accordingly, a highly durable rolling mat can be produced by knitting the monofilament fiber so as to sandwich the rib parts as described earlier. Furthermore, since a monofilament fiber is a single fiber, significant advantages can be gained including an extremely low likelihood of adherence of stains and the easiness of drying due to nonabsorption of moisture as compared to, for example, a twisted yarn type fiber (multifilament). Therefore, a rolling mat that is vastly superior in terms of sanitation management is formed.

Meanwhile, since polyethylene fiber is a fiber made of polyethylene resin whose molecular structure does not include a polar group (reactive group), polyethylene fiber exhibits superb water drainability due to the lack of moisture absorption to such an extent that moisture is repelled and hardly reacts with organic substances such as food material and detergents. Therefore, by utilizing fiber made of the polyethylene resin in the knitted string part as an example of a string material part besides the monofilament fiber described earlier, a rolling mat with superior sanitary performance can be obtained. In addition, among polyethylene fibers, since a molecular structure of high molecular weight polyethylene fiber that is produced by stretching high molecular weight polyethylene resin into fibers has particularly long molecular chains, high molecular weight polyethylene fiber has a physical property of high strength in a longitudinal direction of fibers produced by stretching such high molecular weight polyethylene resin. Furthermore, high molecular weight polyethylene resin also has a physical property of low elongation in which elongation is reduced due to a stretching treatment. Therefore, in addition to having high strength, the knitted string part can prevent situations where the string material part stretches and becomes incapable of returning to its original state after an extended period of use and can maintain an initial state of the rolling mat. As a result, a rolling mat that is significantly tougher and more durable than conventional products can be created.

In addition, the rib parts have hardness that is at least higher than silicone resins such as silicone rubber. Therefore, with the rolling mat according to the present invention, a force by which food material is pressed is more easily conveyed to the hands of a chef when rolling food material, shaping makizushi, or the like. Therefore, since the right amount of force for pressing down on food material can be readily determined, makizushi or the like with even better taste can be prepared.

The present invention is configured as described above and thereby realizes a rolling mat which is easy to roll, which is sanitary, and which enables the right amount of force for pressing down on food material to be readily determined.

In this respect, while the present invention uses, for example, plastic rib parts and man-made knitted string parts in consideration of sanitary performance, toughness, and the like, the use of such parts gives rise to new, specific problems that must be addressed. Therefore, in order to solve these specific problems or to produce greater technical effects, the various favorable modes described below are desirably adopted.

First, in at least a string path through which the knitted string part passes, a boundary between upper and lower surfaces of the rib part and a side surface in the rolling direction has a rounded corner square shape (Moreover, an upper surface and a lower surface of the "upper and lower surfaces" represent a positional relationship relative to one another in which, for example, when the rolling mat is turned over from a state where the rolling mat is spread and placed, the lower surface becomes the upper surface and the upper surface becomes the lower surface; the same description shall apply hereinafter).

Accordingly, since the boundary between the upper and lower surfaces and the side surface improves sliding performance with the knitted string part, the rolling mat can be easily rolled and spread. Specifically, while the knitted string part made of chemical fiber can be favorably rolled and spread due to sliding movement relative to the rib parts, experiments revealed that localized frictional action at corners of the rib parts resulted in a decline in slidability. In particular, when monofilament fiber is used as the knitted string part, since the monofilament fiber is simply a linear plastic material and therefore has high rigidity and low elongation and the fiber deforms less at corner boundaries of the rib parts as compared to a twisted yarn of flexible cotton threads which is used in conventional rolling mats, a frictional force that bites into the corners in a localized manner is generated and causes a decline in slidability when rolling and spreading the rolling mat. In consideration thereof, rolling operations are facilitated by preventing localized friction of the knitted string part due to the rounded corner square shape of the corners of the rib parts and improving sliding with the knitted string part so that a positional relationship between the rib parts and the knitted string part to be easily restored when, for example, a rolled rolling mat is spread on a flat plate. In addition, since the boundary between the upper and lower surfaces and the side surface of the rib part can improve sliding performance with the knitted string part, damage of the knitted string part which may occur due to sliding movement against the rib parts can be reduced and durability of the knitted string part can be improved.

Next, the rib parts favorably include a string regulating part for regulating a string path, through which the knitted string part passes, by engaging with the knitted string part on a surface (a surface exposed to the outside; the same description shall apply hereinafter) of the rib parts. Accordingly, even when sliding between the rib parts and the knitted string part is facilitated, for example, by forming a groove part along a rolling direction on the surface of the rib parts and providing a string path by housing the knitted string part in the groove part, movement such as meandering of the knitted string part can be regulated to prevent lateral detachment of the rib parts from the knitted string part and to uniformly arrange end surfaces of the rib parts in the long side direction.

Next, the string regulating part is favorably a protruding part that protrudes from the surface of the rib parts. Accordingly, the string regulating part is formed without being reduced in height from a reference plane (in other words, an approximate area of a primary plane) of the rib part surface and a thickness (height) of the rib parts can be formed at a height of a necessary minimum design value even when a plastic material that is lower in bending rigidity than conventional bamboo material or the like is used as the rib parts. Specifically, when the string regulating part is a groove part along a rolling direction (a short side direction of the rib parts) of the surface of the rib parts, since stress concentrates on the groove part and makes the rib parts more susceptible to bending, the entire rib parts must be formed thick in order to ensure strength. However, if the string regulating part is a protruding part, since such stress concentration can be alleviated, an approximate area that constitutes the primary plane of the rib parts can be formed thinner. As a result, the entire rolling mat can be made lighter and rolling operations can be performed with greater ease as compared to rolling mats that use thick rib parts.

Next, favorably, the string path is a flat part of the rib part surface and the string regulating part is configured by having a fine uneven pattern arranged around the flat part. In this manner, when there is a fine uneven pattern (a fine pattern made up of dots, stripes, a pear skin, or the like which may also be referred to as an embossed pattern, an etched pattern, or the like) on the surface of the rib parts, an effect of preventing sticking of rice grains is produced when making a California Roll (a roll with rice on the outside and seaweed on the inside) or the like. In addition, for example, the flat part of the rib part surface is left as a string path portion and the uneven pattern is arranged around and excluding the flat portion. Accordingly, meandering of the knitted string part on the uneven pattern and damage to the knitted string part due to the uneven pattern can be prevented. Furthermore, due to the engagement of the uneven pattern around the flat part with the knitted string part, a situation where the rib parts detach from the knitted string part or the like can be prevented.

Next, favorably, the string regulating part is a recess formed on a boundary between the upper and lower surfaces and the side surface in the rolling direction of the rib parts, and a longitudinal cross section shape of the recess in the rolling direction is a rounded corner square shape. Therefore, due to the recess, the string path can be regulated and, at the same time, the rounded corner square shape of the recess can improve the sliding performance of the knitted string part. In addition, compared to a rolling mat in which the entire boundary between the upper and lower surfaces and the side surface of the rib part is given a rounded corner square shape, areas of the upper and lower surfaces that is used to press food material can be increased. Furthermore, when the recess of the rib parts is formed deeper than an end part of the side surface of the rib parts, spacing between the rib parts can be reduced in consideration of the knitted string part being housed and the possibility of penetration by rice grains between the rib parts can be reduced.

Moreover, favorably, the recess formed on the boundary between the upper and lower surfaces and the side surface in the rolling direction of the rib parts has an approximately V shaped cross section in a recessing direction, which is the long side direction of the rib parts. Accordingly, the knitted string part is gathered in a bottom part of the recess, a position of the knitted string part can be kept constant more easily, and the plurality of rib parts can be arranged neatly.

Next, when the string material part constituting the knitted string part is formed of high molecular weight polyethylene fiber, a fiber direction thereof as a whole is favorably aligned approximately along the rolling direction. Accordingly, since high molecular weight polyethylene fiber has physical properties of high strength and low elongation in a fiber direction in which polyethylene resin is stretched, the physical properties can be effectively utilized in the rolling direction in which the rolling mat most requires these physical properties. As a result, a rolling mat with high durability can be produced.

In addition, when the string material part is made of high molecular weight polyethylene fiber as described above, the string material part is more favorably formed by braiding (knitting) a plurality of bundles of high molecular weight polyethylene fiber in a braid like shape so that the bundles diagonally intersect each other with respect to the rolling direction of the rolling mat. In this manner, forming the string material part by twisting a plurality of bundles of high molecular weight polyethylene fiber in a braid like shape produces even higher durability against friction with the rib parts, friction and shock when used on a cutting board, and the like.

Furthermore, since the string material part is braided so as to diagonally intersect each other with respect to the rolling direction, the diagonally intersecting angle changes when rolling and spreading the rolling mat and slight and desired elasticity is exhibited in the rolling direction of the rolling mat. Therefore, even when the high molecular weight polyethylene fiber constituting the string material part is a low elongation fiber that hardly stretches in the rolling direction, an angle that enables rolling can be easily formed between the plurality of adjacent rib parts (this is presumably due to the fact that slightly rotating the rib part between the first string material part and the second string material part which sandwich the rib part from above and below causes the string material parts to slightly stretch so as to follow the rotation). Accordingly, the rolling mat can be easily rolled and spread.

Next, favorably, the string material part is constituted by a first string material part and a second string material part that are separated from one another in an area where the rib parts are sandwiched, the first string material part and the second string material part are tied in a knot at a position of an outer end surface part of a terminal rib part that is arranged at an end in the rolling direction among the plurality of rib parts, and the outer end surface part of the terminal rib part has an outer recessed part that is recessed inward in the rolling direction at a position corresponding to the tied knot.

With such a rolling mat, a lump-like knot of the knitted string part can be housed in the outer recessed part and the knot can be prevented from being exposed to the outside. This enables an improvement in sanitary performance by preventing stains and the like from adhering to the knot as well as an improvement in durability of the knitted string part by preventing the knot from coming into contact with other objects. Furthermore, by housing the knot in the outer recessed part described above, since a degree of protrusion of an excess string part ahead of the knot can be reduced and the excess string part can be prevented from coming into contact with a hand (in particular, when the string material part is monofilament fiber, the excess string part that is almost like a needle can be prevented from coming into contact with the hand), easiness of rolling operations can be improved and, at the same time, sanitary performance can also be improved.

Next, favorably, the excess string part ahead of the knot is cut and a round or spherical part is formed on the cut surface. It should be noted that cutting of the excess string part as described herein includes both a case where all of the excess string part is cut and a case where a part of the excess string part is cut. Accordingly, since the probability of the excess string part ahead of the knot coming into contact with the hand is reduced, rolling operations and the like can be performed with greater ease and favorable sanitary performance can be realized. In addition, since the cut surface of the excess string part has a round or spherical part produced by heating and melting or the like, risks of the knot coming undone or a terminal part of the fiber becoming frayed can be prevented. Furthermore, when the string material part is monofilament fiber, even if a tip of the excess string part comes into contact with a hand, a sense of discomfort created by such contact can be suppressed.

Next, favorably, an end part of the knitted string part is embedded in a terminal rib part that is arranged at an end in the rolling direction among the plurality of rib parts. Therefore, for example, even when the string material part is tied into a knot at a position of the terminal rib part and a lump-like knot or an excess string part ahead of the knot is present at an end part of the knitted string part, terminal treatment of the knitted string part that is most favorable in terms of sanitary performance can be realized by hiding the knot or the excess string part ahead of the knot inside the terminal rib part. In addition, by hiding the end part of the string material part inside the terminal rib part, a situation can be prevented where an end part of a string material part with high rigidity which is almost like a thorn comes into contact with a hand.

Moreover, favorably, such a terminal rib part is constituted by a core part to which the knitted string part is connected and a cover part which covers the core part and which is bonded to the core part. Accordingly, by winding an end part of the knitted string part around the core part or tying the end part of the knitted string part to the core part and then bonding the core part and a cover part to one other while sandwiching the end part of the knitted string part, the end part of the knitted string part can be reliably embedded into and fixed to the terminal rib part. In addition, for example, by winding the end part of the knitted string part around the core part and then bonding the cover part to the core part from above, a difficult operation of tying the string material part into a knot can be omitted. Examples of methods for bonding the core part and the cover part to each other include a welding method involving heating and melting, an integrating method involving heating and welding while sandwiching an appropriate thermoplastic adhesive member, and a bonding and joining method using an adhesive such as an epoxy adhesive.

Furthermore, favorably, in the terminal rib part constituted by a core part and a cover part as described above, an outer end surface of the core part in the rolling direction is an approximately flat surface and the cover part has a sheet shape that is bonded to the approximately flat surface. Accordingly, since the cover part can be bonded to a surface that is approximately flat, a bonding operation can be easily performed. In addition, if the cover part has a sheet shape, simple planar adhesion and bonding to the core part can be performed. Furthermore, when the core part and the cover part are to be bonded by heating and melting, if the cover part has a relatively thin sheet shape, since the core part and the cover part can be bonded in a short period of time, a risk of damage to an end part of the knitted string part positioned between the core part and the cover part by melting due to heating or the like can be reduced.

Advantageous of the Invention

As described above, according to the present invention, a rolling mat which is easy to roll, which is sanitary, and which enables the right amount of force for pressing down on food material to be readily determined can be provided.

BRIEF DESCRIPTION OF THE DRAWINGS

FIG. 1 shows a rolling mat according to a first embodiment of the present invention, in which

FIG. 3 is a diagram showing a case where the knitted string part shown in FIG. 1 is formed by braiding a plurality of bundles of high molecular weight polyethylene fiber in a braid like shape, in which

FIG. 5 is a partial enlarged sectional view of the rolling mat shown in FIG. 1, in which

FIG. 6 shows a modification of the rolling mat according to the first embodiment of the present invention, in which

FIG. 8 shows a rib part of a rolling mat according to a second embodiment of the present invention, in which

FIG. 9 shows a modification of the rib part shown in FIG. 8, in which

FIG. 10 shows a modification of the rib part shown in FIG. 9, in which

FIG. 11 shows a modification of the rib part shown in FIG. 10, in which

FIG. 12 shows a rib part of a rolling mat according to a third embodiment of the present invention, in which

FIG. 13 shows a modification of the rib part shown in FIG. 12, in which

FIG. 14 shows a rolling mat according to a fourth embodiment of the present invention, in which

FIG. 15 shows a rolling mat according to a fifth embodiment of the present invention, in which

FIG. 16 shows a modification of the rolling mat shown in FIG. 15, wherein

FIG. 17 shows a modification of the rolling mat shown in FIG. 16, wherein FIG. 17(a) is a partial upper view thereof, FIG. 17(b) is an enlarged upper view of a periphery of a terminal rib part thereof, FIG. 17(c) is a sectional view taken along M-M in FIG. 17(b), and FIG. 17(d) is a diagram illustrating an example of a method of forming a terminal rib part thereof.

FIG. 18 shows a modification of the rolling mat shown in FIG. 17, wherein FIG. 18(a) is a partial upper view thereof, FIG. 18(b) is an enlarged upper view of a periphery of a terminal rib part thereof, FIG. 18(c) is a sectional view taken along P-P in FIG. 18(b), FIG. 18(d) is a diagram illustrating an example of a method of forming a terminal rib part thereof, and FIG. 18(e) is a diagram showing a modification of FIG. 18(d).

FIG. 19 shows a modification of the rolling mat shown in FIG. 18, wherein

DESCRIPTION OF EMBODIMENTS

Figure 1A:
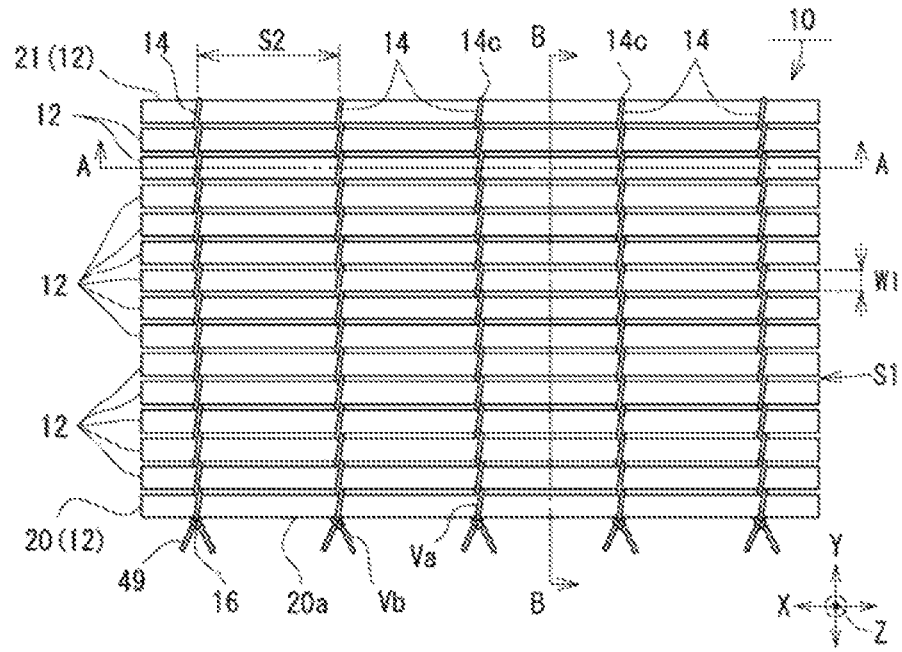
FIG. 1(a) is an upper view thereof.

Hereinafter, preferred embodiments of the present invention will be described in detail with reference to the drawings.

While the embodiments described below represent preferable specific examples of the present invention and are therefore subject to various technically favorable limitations, it is to be understood that the scope of the present invention is not limited to these aspects unless a description that specifically limits the present invention is otherwise provided below. In addition, in the drawings described below, sections denoted by the same reference numerals represent similar configurations or components.

First Embodiment

Figure 1B:
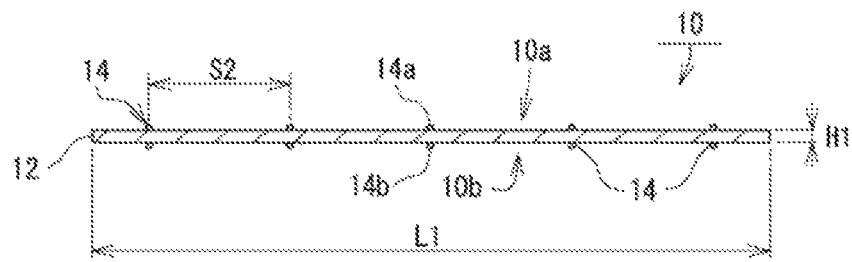
FIG. 1(b) is a sectional view taken along A-A in FIG. 1(a)
Figure 1C:
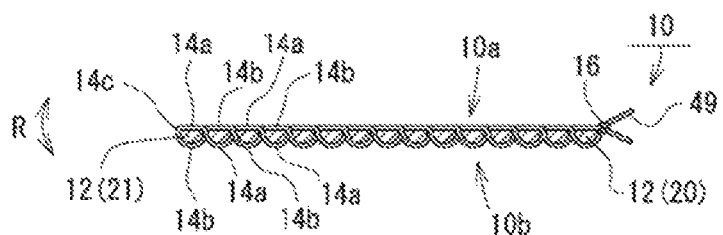
FIG. 1(c) is sectional view taken along B-B in FIG. 1(a).

First, a rolling mat 10 according to a first embodiment of the present invention will be described with reference to FIGS. 1 to 5. In FIG. 1, directions of arrows denoted by X, Y, and Z represent three dimensional directions in the respective drawings and are perpendicular to one another.

The rolling mat 10 shown in FIG. 1 is a rolling mat (makisu) that is used in hand rolling operations of food such as norimaki, makizushi, and datemaki, and is also referred to as a makisudare (rolling bamboo screen). The entire rolling mat 10 is formed in a bamboo screen shape and constitutes a plurality of rib parts 12 and a plurality of knitted string parts 14.

The rib part 12 is a member having a function that is similar to that of a bamboo strip in a general rolling mat made of bamboo material and has an elongated rod shape. A plurality of the rib parts 12 are arranged in a direction Y in which food material is rolled so that both ends of the rib parts are aligned in a long side direction. A required gap S1 is provided between the respective rib parts 12. For each gap S1, the rib part 12 is to be rolled with an angle that enables upward and downward rotations with respect to adjacent rib parts 12.

In addition, the rib part 12 is formed of a plastic material and/or a metal material whose hardness and rigidity are at least higher than silicone resin.

As the plastic material, for example, a plastic resin such as polyethylene, polypropylene, nylon, polyester, ABS (acrylnitrile butadiene styrene), PBT (polybutylene terephthalate), and Duracon (registered trademark) can be used. The plastic material is favorably a thermoplastic resin with superior bending rigidity and heat resisting property. Other types of plastics that can be used include fiber reinforced plastic (FRP) made of polyester, epoxy resin, and the like. These resins can be used by being formed into solid or hollow pipes.

As the metal material, a metal alloy that is highly resistant to corrosion such as aluminum, stainless steel, and titanium is favorably used. In consideration of weight, the metal alloy is preferably formed into hollow pipes.

Moreover, the rolling mat 10 may be configured by appropriately combining a plurality of rib parts 12 made of a plurality of different materials including plastic materials and/or metal materials. In this case, for example, by combining rib parts made of a metal material with relatively high rigidity and a plastic material with relatively low rigidity, a rolling mat is produced which is lightweight as a whole, which has superior bending rigidity, and which is easy to roll.

Respective dimensions of the rib parts 12 and the number of rib parts 12 may be determined in accordance with the usage of the scroll. The rib part 12 according to the present embodiment is formed of a plastic material constituted by polypropylene resin and, for example, has a width W1 of 4 to 6 mm, a height (thickness) H1 of 3 to 5 mm, and a length (corresponding to a width of the rolling mat) L1 of 200 to 300 mm to enable the rolling mat to be favorably used for norimaki and the like. In addition, the rolling mat 10 is configured by arranging, for example, 20 to 60 rib parts 12 in a rolling direction Y. Moreover, since a plastic rib part 12 has a lower bending elastic modulus than bamboo material and is easily bent in a long side direction X, a ratio of the height H1 with respect to the width W1 may be increased as compared to a height-to-width ratio of a bamboo rib part.

The knitted string part 14 connects the plurality of rib parts 12 with each other by knitting string material parts in the rolling direction Y of the rolling mat 10 while interposing the rib parts 12. The knitted string parts 14 are arranged in a plurality of rows at a required gap S2 in a direction X that is perpendicular to the rolling direction Y.

Each knitted string part 14 in FIG. 1 is knitted in a similar manner to a known knitting method used in bamboo rolling mats. Specifically, a vicinity of the center of a single string material part is folded back, the folded back portion 14c is hooked to a terminal rib part 21 that is arranged at one end in the rolling direction Y and branched upward and downward (the terminal rib part 21 becomes a knitting start side). Accordingly, in an area in which the rib part 12 is sandwiched (for example, when passing along an upper surface 10a and a lower surface 10b), the string material part is configured so as to become a first string material part 14a and a second string material part 14b that are separated from each other. In addition, with the folded back portion 14c as a base point, the first string material part 14a and the second string material part 14b successively intersect each other so as to bend in a vertical direction Z between adjacent rib parts 12 (in other words, the gap S1) such that when one of the string material parts is arranged on an upper surface of a rib part 12, the other string material part is arranged on a lower surface of the same rib part 12. Furthermore, the first string material part 14a and the second string material part 14b are tied to form a knot 16 at an outer end surface part 20a of a terminal rib part 20 arranged at the other end in the rolling direction Y (this terminal rib part 20 becomes a knitting end side). In this manner, the first string material part 14a and the second string material part 14b connect the plurality of rib parts 12 so as to sandwich entire circumferences of the respective rib parts 12.

In the present invention, unlike in FIG. 1, two independent string material parts may be used to constitute the first and second string material parts 14a and 14b which are separated from each other and knots 16 may be formed at the terminal rib parts 20 and 21 at both ends. However, since the knots 16 and excess string parts 49 ahead of the knots 16 are likely to interfere with the use of the rolling mat 10, it is favorable to constitute the first and second string material parts 14a and 14b using one string material part and create the knot 16 and the excess string part 49 only on one side as shown in FIG. 1.

In this case, the string material parts 14a and 14b that constitute each knitted string part 14 are formed of chemical fiber. As the chemical fiber, a most favorable material is monofilament fiber or high molecular weight polyethylene fiber that is produced by stretching high molecular weight polyethylene resin into fibers.

First, a case where the knitted string part 14 shown in FIG. 1 is formed of man-made monofilament fiber as a favorable example will be described with reference to FIG. 2.

Figure 2:
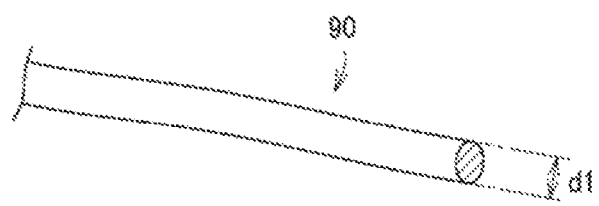
FIG. 2 is an enlarged perspective view of portion Va shown in FIG. 1 in a case where a knitted string part shown in FIG. 1 is monofilament fiber.

FIG. 2 is a partial enlarged view of portion Va shown in FIG. 1 in a case where the string material part constituting the knitted string part 14 shown in FIG. 1 is man-made monofilament fiber.

Figure 4:
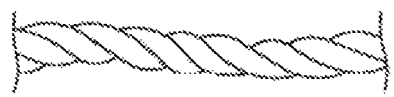
FIG. 4 is a partial enlarged view of a twisted yarn.

A string material part 90 shown in FIG. 2 is configured as an independently formed single monofilament (monofilament string) instead of a twisted yarn in which a plurality of string material parts are twisted together (refer to FIG. 4).

As the string material part 90, for example, a thermoplastic resin such as nylon, polyester, polypropylene, polybutylene terephthalate (PBT), and polyoxymethylene (POM) that is stretched and molded into monofilament fiber having an outer diameter of around 0.1 to 1 mm can be favorably used (the string material part 90 shown in FIG. 2 is a nylon fiber monofilament with a diameter d1 of 0.5 mm). The string material part 90 made of such monofilament fiber is a plastic body with a smooth surface and a cylindrical shape, having low elongation and high strength, and having significantly improved durability. Therefore, the string material part 90 can effectively avoid adherence of stains and absorption of moisture, and can prevent a situation where the rolling mat is stretched and is unable to return to its original state by maintaining an initial state of the rolling mat even after the rolling mat has been used for a long period of time.

For example, a test involving scrubbing with a nylon brush in a long side direction of the rib parts (the X direction in FIG. 1) to simulate a cleaning operation of the rolling mat was performed on a nylon monofilament fiber (diameter 0.5 mm) and a conventional twisted yarn (diameter approximately 1.0 mm) of cotton threads as the string material part 90. As a result, with the twisted yarn, fluffing occurred after scrubbing around 8000 times and breakage eventually occurred at around 15000 times. In comparison, with the string material part 90 made of nylon monofilament fiber, neither breakage nor changes such as damage occurred after scrubbing 15000 times.

Next, a case where each knitted string part 14 shown in FIG. 1 is formed of high molecular weight polyethylene fiber that is produced by stretching high molecular weight polyethylene resin into fibers will be described with reference to FIG. 3.

Figure 3A:
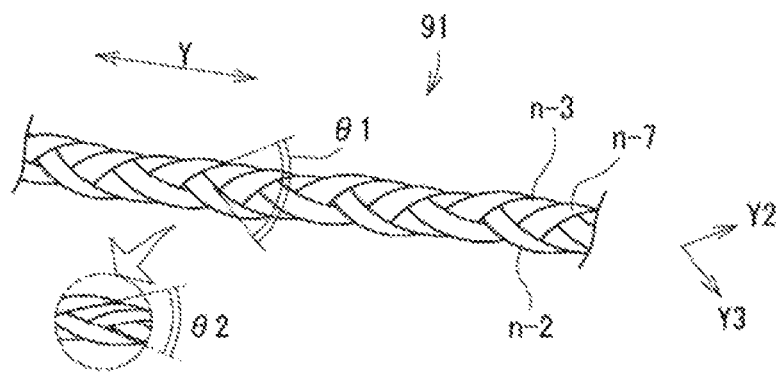
FIG. 3(a) is an enlarged perspective view of portion Va shown in FIG. 1
Figure 3B:
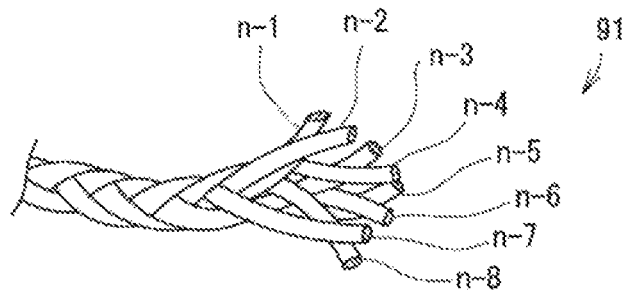
FIG. 3(b) is an enlarged perspective view of portion Vb (an excess string part) shown in FIG. 1.

FIG. 3 is a diagram showing a case where the string material part that constitutes the knitted string part 14 shown in FIG. 1 is formed by braiding a plurality of bundles of high molecular weight polyethylene fiber in a braid like shape, in which FIG. 3(a) is a partial enlarged view of the portion Va shown in FIG. 1 and FIG. 3(b) is a partial enlarged view of portion Vb shown in FIG. 1.

A string material part 91 shown in FIG. 3 is formed of polyethylene resin that does not have a polar group. Therefore, the string material part 91 exhibits superb water drainability due to the lack of moisture absorption to such an extent that moisture is repelled, and hardly reacts with stains or the like and can maintain superior sanitary performance.

In addition, the string material part 91 is particularly made of high molecular weight polyethylene fiber among polyethylene fibers. Since high molecular weight polyethylene fiber is derived from polyethylene resin with high molecular weight and enables stretching to be performed at a high stretching ratio, Young's modulus and rupture strength can be increased. In consideration thereof, high molecular weight polyethylene resin having such characteristics can be dissolved with a solvent into a thread like state and subsequently stretched to create a state where a long molecular chain structure is fully stretched (for example, a gel spinning method). As a result, fibers with high strength are created.

The string material part 91 according to the present embodiment is derived from polyethylene polymer with exceptionally high molecular weight (ultrahigh molecular weight polyethylene resin) among such high molecular weight polyethylene resins. The ultrahigh molecular weight polyethylene resin is dissolved with a solvent and subsequently subjected to super stretching to form ultrahigh molecular weight polyethylene fiber. As the ultrahigh molecular weight polyethylene fiber, for example, Dyneema (registered trademark) manufactured by Toyobo Co., Ltd. can be used.

As described above, since ultrahigh molecular weight polyethylene fiber formed by super stretching (pulling) is used as the string material part 91 according to the present embodiment, fibers are formed as a result of elongation of molecular chains. As a result, significantly high strength is exhibited in a longitudinal direction of the elongated fibers and, at the same time, a physical property of low elongation is provided to such an extent that there is almost no elongation.

In addition, the ultrahigh molecular weight polyethylene fiber having high strength and low elongation in the fiber direction is arranged approximately along the rolling direction Y as a whole as shown in FIG. 1. In other words, a fiber direction of the ultrahigh molecular weight polyethylene fiber (similar to a stretching direction of the stretching treatment performed when forming the fiber) is approximately aligned with the rolling direction Y. It should be noted that the term "as a whole" as used above means that, even though fiber directions Y2 and Y3 may not be partially aligned with the rolling direction Y as shown in FIG. 3, orientations are aligned when viewing an entire length of the string material part to constitute each knitted string part 14 as shown in FIG. 1.

Therefore, a rolling mat 10 can be formed that is significantly tough and highly durable in the rolling direction Y in which durability is most required. In addition, since the ultrahigh molecular weight polyethylene fiber itself hardly stretches in the rolling direction Y, an initial shape of the rolling mat 10 can be maintained even after being used for a long period of time. Therefore, situations can be prevented where the knitted string part 14 gradually stretches and the widened gap S1 between the rib parts 12 traps rice grains, norimaki rolling operations become difficult due to a slackened state of the entire rolling mat 10, or the rib parts 12 easily shift and detach from the knitted string part 14.

Furthermore, as shown in FIG. 3, bundles n1 to n8 are made by assembling the ultrahigh molecular weight polyethylene fiber described above in specific units, and the bundles n1 to n8 are braided (knitted) in a braid like shape to produce the string material part 91. Therefore, higher durability is exhibited with respect to rubbing against a cutting board on which rolling operations are performed, rubbing against the rib parts 12 shown in FIG. 1, and the like.

A braid is a string formed by braiding three or more bundles of fibers. In the case of the string material part 91 shown in FIG. 3, a plurality of ultrahigh molecular weight polyethylene fibers are arranged in a strand shape into bundles n1 to n8 and the bundles n1 to n8 are then braided. Moreover, for example, the number of bundles may range from 4 to 8, and while there are eight bundles n-1 to n-8 shown in the diagram, the number of bundles according to the present invention is not limited thereto.

While methods of knitting a braid can be roughly divided into a "square braid" with an approximately square cross section, a "flat braid" with a cross section that is flat like a ribbon, a "round braid" with an approximately round cross section, and the like, the present invention may adopt any of these braids. However, it is favorable to adopt a "round braid" which has a small area of contact with other objects such as the rib parts 12 shown in FIG. 1 and a cutting board, which is not readily fluffed to reach breakage, has small elongation deformation due to tensile force since fibers are arranged approximately linearly in the Y direction, and has superior slidability with respect to the rib parts 12.

In addition, while the braid according to the present invention may be created by crossing the fiber bundles n-1 to n-8 diagonally, forward and backward, or upward and downward, the string material part 91 shown in FIG. 3 is formed by knitting (braiding) in a braid shape so as to cross each other slightly diagonally with respect to the rolling direction Y. Therefore, an angle θ1 of diagonal crossing by the bundles n-1 to n-8 in a state where the rolling mat is spread changes to a smaller diagonally intersecting angle θ2 as shown in a diagram enclosed by a two-dot chain line in FIG. 3(*a*) that is a partial enlarged view of the rolling mat when rolled. Furthermore, the angle θ2 is restored to the angle θ1 when the rolling mat is spread from a rolled state.

As described above, by making the string material part 91 into a braid shape, slight and desired elasticity is exhibited in the rolling direction Y and a rolling motion of the rolling mat can be prevented from being impeded even when the ultrahigh molecular weight polyethylene fiber is a fiber that hardly stretches in the rolling direction Y as a described above. In other words, an angle can be readily provided to the plurality of adjacent rib parts when rotating in a vertical direction (a rotation in a direction R shown in FIG. 1(*c*)) and, as a result, the rolling mat 10 can be easily rolled and spread once again.

Moreover, a difference between the angle θ1 and the angle θ2 shown in FIG. 3 is small. An excessive difference causes the gap S1 between the rib parts 12 shown in FIG. 1 to be too large and is not favorable.

In addition, while the string material part 91 according to the present invention may be given a twisted yarn shape in which a bundle of fibers is twisted as shown in FIG. 4, since this structure is susceptible to deformation such as crushing due to the twisted yarn shape being easily deformed by friction or the like, elongation deformation that occurs as a result of prolonged use increases the gap S1 and impedes rolling operations. Therefore, from the perspectives of strength and desired elasticity described earlier, a braid shape is more favorable.

Furthermore, with the string material part 91, even if a braid shape is adopted which has a risk of reduced drying performance due to adherence of moisture between the braided bundles, since polyethylene fiber is used, a rolling mat with superior drying performance can be produced.

The following is a summary of a comparative study on drying performance among applications in rolling mats of a string material part whose strength is equal to or greater than rupture strength of cotton thread in a conventional bamboo rolling mat.

Contents of Samples

Contents of each sample are as follows. Rupture strength was measured in accordance with JIS L 1013:2010 "Testing methods for man-made filament strings".

Sample 1: Polyester resin monofilament Diameter 0.4 mm, rupture strength 73 N

Sample 2: Braid of ultrahigh molecular weight polyethylene fiber

Diameter 0.4 mm, rupture strength 184 N

The braid was a round braid.

Sample 3: Twisted yarn of polyester fiber Diameter 0.45 mm, rupture strength 88 N Sample 4: Twisted yarn of cotton string Diameter 0.8 mm, rupture strength 56 N Testing Method Tests were performed in order of methods 1 to 3 below on samples 1 to 4 above respectively cut into 1 m long strips.

Method 1: After measuring initial weight, each sample was immersed in water at normal temperature for 24 hours.

Method 2: After measuring weight after immersion, each sample was placed on a polyester film in a stretched state.

Method 3: Each sample was left in a room at a temperature of 16° C. and humidity of 65%, and weight of each sample was measured at 15 minute intervals.

Test Results

Drying times of the samples 1 to 4 described above were as follows. The numerical values provided below represent, from left to right, initial weight, weight after immersion, and weight at each lapse of 15 minutes while been left in the room. The weight are in grams.

Sample 1: 0.18 initially→0.19 after immersion→0.18 after 15 minutes (dried in 15 minutes)

Sample 2: 0.15 initially→0.24 after immersion→0.17 after 15 minutes→0.15 after 30 minutes (dried in 30 minutes)

Sample 3: 0.21 initially→0.35 after immersion→0.28 after 15 minutes→0.23 after 30 minutes→0.21 after 45 minutes (dried in 45 minutes)

Sample 4: 0.49 initially→1.67 after immersion→1.48 after 15 minutes→1.29 after 30 minutes→1.12 after 45 minutes→1.04 after 60 minutes→0.83 after 75 minutes→0.74 after 90 minutes→0.66 after 105 minutes→0.56 after 120 minutes→0.49 after 135 minutes (dried in 135 minutes)

From the test results provided above, it was found that the string material parts made of chemical fibers (samples 1 to 3) had higher rupture strengths and shorter drying times as compared to cotton string that is used in the knitted string part of a conventional rolling mat.

In particular, since the string material part made of a monofilament (sample 1) had a significantly short drying time, adopting this string material part as a string material part to constitute the knitted string part of a rolling mat is favorable since growth of bacteria or the like can be suppressed and a rolling mat with superior sanitary performance can be produced.

In addition, with the braid of ultrahigh molecular weight polyethylene fiber (sample 2), since the braid is created so that a plurality of fiber bundles diagonally cross one another, there was a risk of moisture adherence between the braided fiber bundles and a consequential decline in drying performance. However, it was found that the use of polyethylene resin which does not have a polar group as the string material part resulted in the absence of moisture adherence and, consequently, superior water drainability was realized. Therefore, a rolling mat with superior drying performance can be produced.

Furthermore, a comparison between sample 1 and sample 2 which both exhibited superior drying performance revealed that sample 2 or the braid (round braid) of ultrahigh molecular weight polyethylene fiber has higher rupture strength when diameters are the same. Accordingly, by adopting a braid of ultrahigh molecular weight polyethylene fiber as the string material part as in the present embodiment, durability can be improved significantly. Moreover, a string material part with a smallest diameter among the respective samples may potentially be created by lowering the rupture strength of the string material part made of sample 2 (the braid of ultrahigh molecular weight polyethylene fiber) down to a same rupture strength as the samples 1, 3, and 4.

Figure 5A:
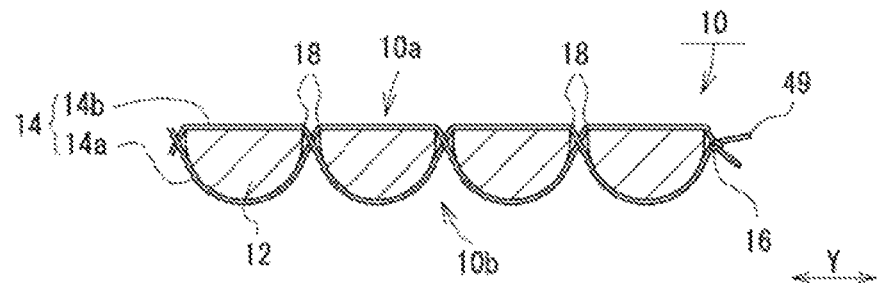
FIG. 5(a) is a partial enlarged view of FIG. 1(c)
Figure 5B:
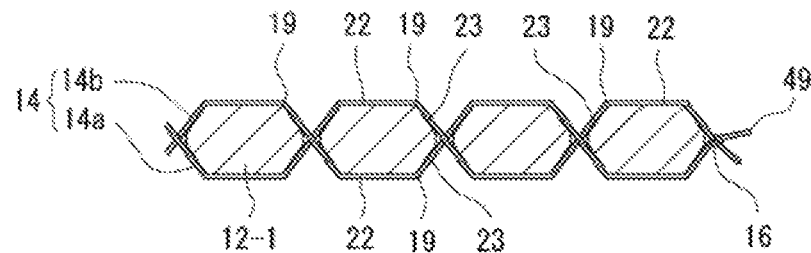
FIG. 5(b) shows a modification of FIG. 5(a), and FIGS. 5(c) and 5(d) are diagrams showing usage states of FIGS. 5(a) and 5(b).

The rib parts 12 of such a rolling mat 10 can be configured in the modes shown in FIGS. 5(a) and 5(b).

Specifically, the rib part 12 shown in FIG. 5(a) has an approximately semicircular longitudinal cross section shape in the rolling direction Y in a similar manner to a conventional bamboo rolling mat in which a side of an upper surface 10a is formed in a flat surface shape and a side of a lower surface 10b is formed in an arc shape, and a corner part 18 is formed at an intersection of the flat surface shape part and the arc shape part.

In addition, in order to enable use in which food material can be placed on the rolling mat without distinguishing between the upper and lower surfaces, a rib part 12-1 shown in FIG. 5(b) has an octagonal longitudinal cross section shape in the rolling direction Y and both upper and lower (front and rear) surfaces are flat surface shapes that are parallel to each other. Furthermore, a corner part 19 is formed at an intersection of a flat surface shape part 22 and a subsequent straight part 23 of the cross section of the rib part 12-1.

Figure 5C:
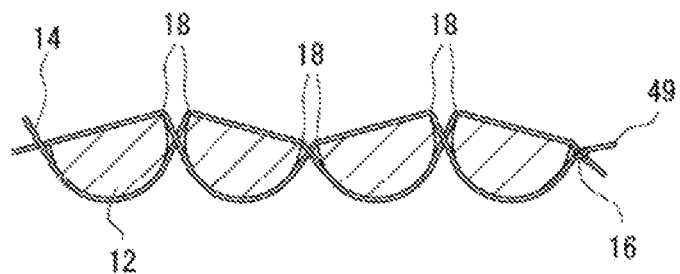
Figure 5D:
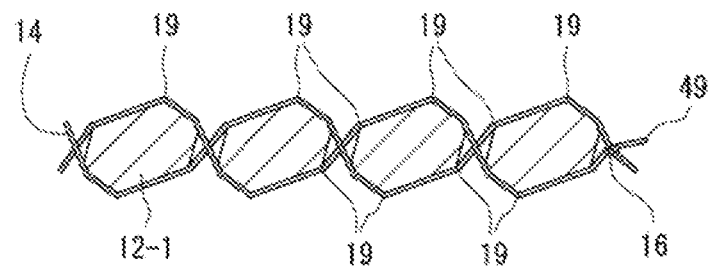

In cases where the corner parts 18 and 19 are provided as shown in FIGS. 5(a) and 5(b), when rolling sushi or the like, the knitted string part 14 (the first and second string material parts 14a and 14b) causes localized friction (in particular, in the case of monofilament fiber, friction to the extent that the monofilament fiber bites) at the corner parts 18 and 19 of the rib parts 12 and 12-1. Accordingly, there is a risk that the rolling mat is not restored to its original flat surface shape as shown in FIGS. 5(c) and 5(d) when the rolling mat is once again spread in a flat surface shape.

In consideration thereof, an improved rolling mat for solving the issue of restoration difficulty will now be described with reference to FIG. 6.

Modifications of First Embodiment

FIG. 6 shows rolling mats 101 to 104 according to modifications of the first embodiment. Only longitudinal cross sections in the rolling direction Y of rib parts are shown. The only differences of rolling mats 101 to 104 from the rolling mat 10 described above are rib parts 25 to 28.

Specifically, with the rolling mats 101 to 104 shown in FIG. 6, boundaries between upper and lower surfaces and side surfaces in the rolling direction Y of the rib parts 25 to 28 are configured as sliding parts 25a to 28a which enables the knitted string part 14 to slide more easily. Accordingly, sliding movement of the knitted string part 14 and the rib parts 25 to 28 is facilitated, and when the rolling mats 101 to 104 are spread and placed on a flat plate after being rolled, a flat surface shape can be created in which the respective rib parts 25 to 28 are oriented uniformly.

Figure 6A:
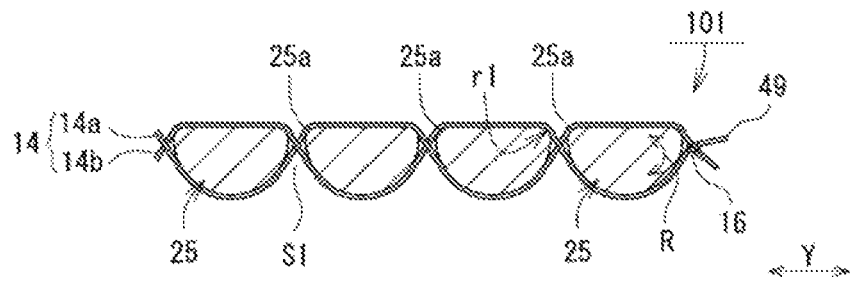
FIG. 6(a) shows a modification of FIG. 5(a)

Specifically, in the rolling mat 101 shown in FIG. 6(a), the sliding part 25a is formed at least in a string path through which the knitted string part 14 passes by giving a boundary between an upper surface and a side surface in the rolling direction Y of the rib part 25 a round corner square shape having a prescribed curvature radius r1. Accordingly, by enabling rotation of the rib part 25 in a direction R between the first string material part 14a and the second string material part 14b, the rolling mat can be more easily rolled and, at the same time, flatness of the entire rolling mat can be maintained due to good restoration performance after use.

Figure 6B:
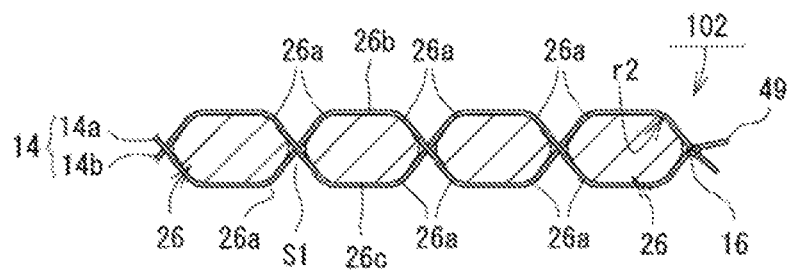
FIG. 6(b) shows a modification of FIG. 5(b), and FIGS. 6(c) and 6(d) show other modifications.

In the rolling mat 102 shown in FIG. 6(b), the sliding part 26a is formed by giving not only a boundary between an upper surface 26b and a side surface in the rolling direction of the rib part 26 but also a lower surface 26c and a side surface in the rolling direction Y a round corner square shape having a prescribed curvature radius r2. In addition, with the rib part 26 shown in FIG. 6(b), since most of a portion that rubs against the knitted string part 14 has a cross section shape without corner parts, easiness of rolling and easiness of spreading are increased as compared to the rolling mat 101 shown in FIG. 6(a).

Figure 7:
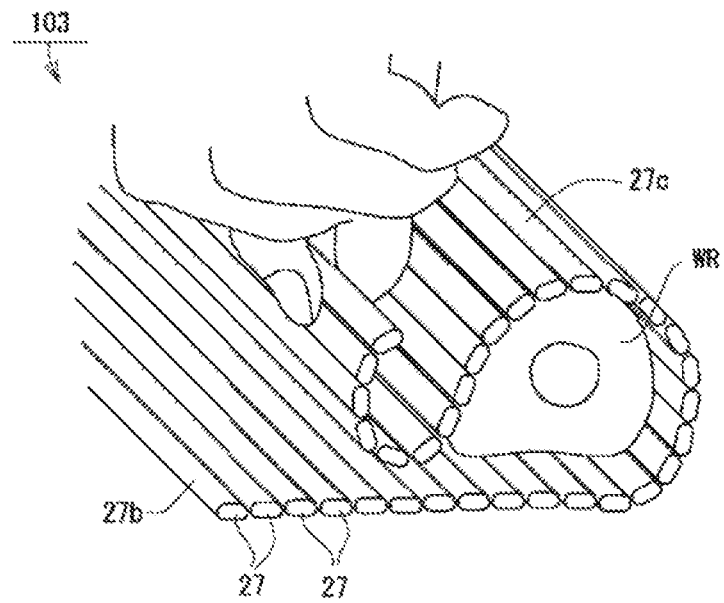
FIG. 7 is a diagram showing a state where the rolling mat shown in FIG. 6(c) is used.

Furthermore, with the rolling mat 102, operability of the rolling mat is improved by giving the upper surface 26b and the lower surface 26c of the rib part 26 flat surface shapes that are approximately parallel to each other as a whole. Specifically, the rolling mat 101 shown in FIG. 6(a) as a whole constitutes an uneven surface in which an apex of the semicircular shape of the lower surface is a protruding part and a gap S1 is a recessed part and has poor flatness. Therefore, for example, when performing an operation of squeezing or rolling while squeezing a norimaki WR as shown in FIG. 7 (the knitted string part is omitted), usability of the rolling mat 101 shown in FIG. 6(a) is not favorable since the upper surface and the lower surface or same surfaces rub against one another and the rib parts 25 do not slide smoothly against one another. In consideration thereof, by configuring the upper surface 26b and the lower surface 26c of the rib part 26 to be approximately parallel to each other and the upper and lower surfaces of the rolling mat as a whole to have flat surface shapes as shown in FIGS. 6(b) and 7, sliding movements can be made smoother and the usability of the rolling mat can be made more favorable.

With the rolling mats illustrated in FIG. 6(b) and thereafter, both upper and lower surfaces are given approximately flat surface shapes as a whole although there are gaps between the rib parts. Accordingly, both upper and lower surfaces can be used to place food material and perform rolling operations. Therefore, "a relationship between an upper surface and a lower surface" described hereinafter is an expression that is used for the sake of convenience to describe a relative positional relationship unless otherwise noted.

Figure 6C:
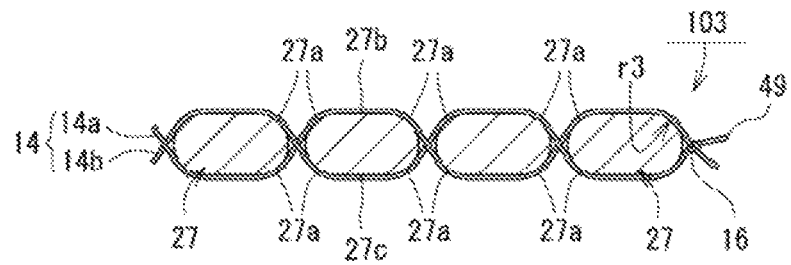

In a similar manner to FIGS. 6(a) and 6(b), in the rolling mat 103 shown in FIG. 6(c), the sliding part 27a is formed at least in a string path through which the knitted string part 14 passes by giving a boundary between upper and lower surfaces 27b and 27c and a side surface in the rolling direction Y of the rib part 27 a round corner square shape. The rolling mat 103 differs from the rolling mats 101 and 102 shown in FIGS. 6(a) and 6(b) in a roundness of the round corner square shape of the sliding part 27a. A curvature radius r3 of the round corner square shape is larger than the curvature radii r1 and r2 shown in FIGS. 6(a) and 6(b). The sliding part 27a having the large roundness is favorably used when a string material part constituting the knitted string part 14 is made of monofilament fiber. Specifically, unlike the string material part 91 given a braid shape so as to diagonally cross each other with respect to the rolling direction Y shown in FIG. 3, since the string material part 90 made of monofilament fiber shown in FIG. 2 hardly has elasticity and has little flexibility, the string material part 90 has a property that restoring the rolling mat after use to a flat state is difficult due to friction force created by the monofilament fiber that locally bites into the corner part. Therefore, a greater effort must be made in order to prevent biting of the corner part by the string material part 90 made of monofilament fiber shown in FIG. 2. The curvature radius r3 shown in FIG. 6(c) favorably ranges between, for example, 1 to 5 mm.

Furthermore, the rib part 27 shown in FIG. 6(c) is given a cross section shape that is a rounded corner shape or an ellipsoidal shape in which all portions that rub against the knitted string part 14 do not have corner parts.

As described above, with the rolling mat 103, flatness of upper and lower surfaces is ensured and easiness of rolling and easiness of spreading are improved regardless of the type of the string material part.

Figure 6D:
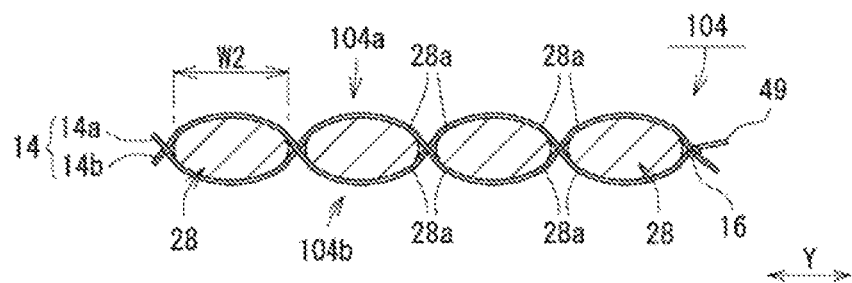

In the rolling mat 104 shown in FIG. 6(d), the rib part 28 is given an ellipsoidal cross section shape. Even when such a shape is adopted, slidability between the sliding part 28a of the rib part 28 and the knitted string part 14 can be improved. Moreover, even with the rolling mat 104 shown in FIG. 6(d), by reducing a dimension W2 of a single rib part 28 in the rolling direction Y while increasing the number of rib parts 28 or by increasing curvature radii of the upper and lower surfaces of the rib parts 28 to give the rib parts 28 a more linear shape, sufficient overall flatness can be secured for an upper surface 104a and a lower surface 104b of the rolling mat 104.

Second Embodiment

Figure 8A:
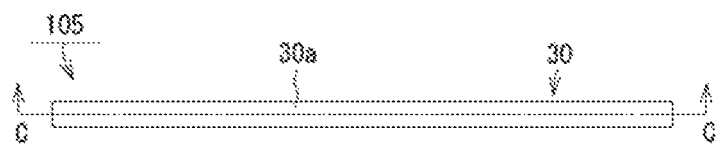
FIG. 8(a) is an upper view of a single rib part and FIG. 8(b) is a sectional view taken along C-C in FIG. 8(a).
Figure 8B:
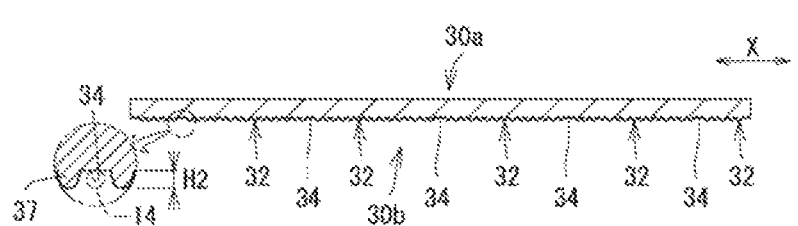

Next, a second embodiment of the present invention will be described with reference to FIG. 8. FIG. 8 shows a rolling mat 105 according to the second embodiment. Only one rib part 30 is shown.

The rolling mat 105 in the drawing only differs from the rolling mats 10 and 101 to 104 described above in shapes of the upper and lower surfaces of the rib part 30, and is similar to FIG. 6(c) and the like in the absence of corner parts from a cross section shape in the rolling direction and the like.

In the rib part 30 shown in FIG. 8, an upper surface 30a is formed flat while a known fine uneven pattern 32 for preventing adherence of rice grains in rolled food is formed on an entire lower surface 30b. A large number of fine dot-like protrusions 37 are arranged to constitute the uneven pattern 32 that is also referred to as an embossed pattern. Accordingly, norimaki and the like can be easily made on the upper surface 30a and rolled food having rice arranged on the outside such as a California Roll can be easily made on the lower surface 30b.

The uneven pattern 32 is not formed in areas corresponding to the knitted string part of each row, and the rib part 30 includes a flat part 34 that is sandwiched between uneven patterns 32 in a long side direction X. Therefore, the protrusions 37 of the uneven pattern 32 around the flat part 34 engage a knitted string part so as regulate movement of the knitted string part in the long side direction X and constitute a string regulating part for regulating a string path through which the knitted string part is to pass.

In this manner, by forming the flat part 34 (string regulating part) that constitutes a string path among the uneven pattern 32, the knitted string part can be prevented from meandering due to the uneven pattern 32 or from getting caught on the protrusions 37 of the uneven pattern 32, or the rib part 30 can be prevented from laterally detaching from the knitted string part.

In addition, a height H2 of the protrusions 37 on both sides of the flat part 34 in the long side direction X (in other words, a depth of the string regulating part) is favorably approximately similar to or greater than a thickness of the knitted string part 14 as shown in a diagram which is enclosed by a two-dot chain line and which is an enlargement of a periphery of the string regulating part. Accordingly, friction can be prevented from being generated between the knitted string part 14 and a working table or the like.

Moreover, while the uneven pattern 32 shown in FIG. 8 is only formed on one surface 30a of the rib part 30, the uneven pattern 32 may be formed on both surfaces 30a and 30b, in which case slipping between the rolling mat and the working table can be suppressed.

Furthermore, the uneven pattern 32 may be provided on all of the plurality of rib parts 30 or only on certain rib parts among the plurality of rib parts 30.

First Modification of Second Embodiment

Figure 9A:
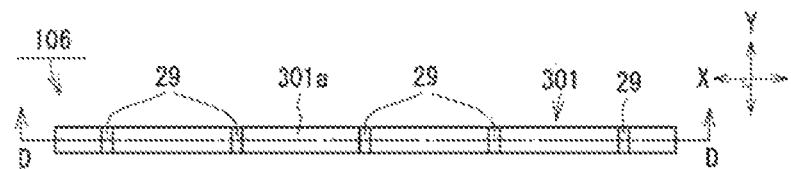
FIG. 9(a) is an upper view thereof and FIG. 9(b) is a sectional view taken along D-D in FIG. 9(a).
Figure 9B:
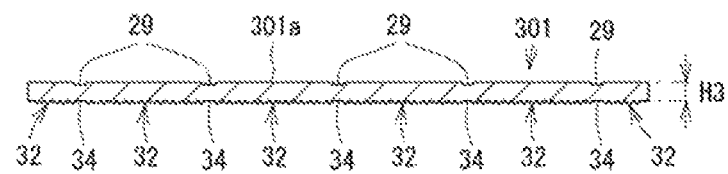

Next, a first modification of the second embodiment described above will be described with reference to FIG. 9. FIG. 9 shows a rolling mat 106 according to a modification of FIG. 8. Only one rib part 301 is shown.

With the rib part 301 according to the present modification, in addition to a string regulating part constituted by the flat part 34 among the uneven pattern 32 on the lower surface, a string regulating part 29 is also formed on an upper surface 301a.

The string regulating part 29 is formed so as to correspond to a string path through which a knitted string part is to pass and has a groove shape formed along the rolling direction Y of the rolling mat (a short side direction of the rib part 301), and regulates a string path through which a knitted string part is to pass due to an engagement between an inner wall of the groove shape and the knitted string part.

Moreover, a depth of the groove shape of the string regulating part 29 is favorably approximately similar to or greater than a thickness of the knitted string part. Accordingly, friction is prevented from being generated between the knitted string part and a working table or the like on both upper and lower surfaces.

Second Modification of Second Embodiment

Figure 10A:
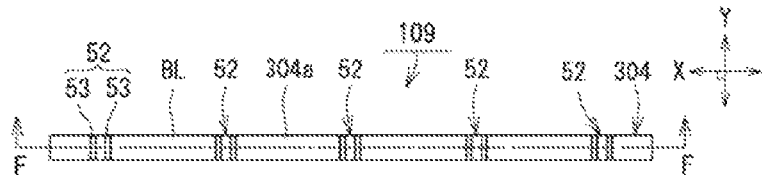
FIG. 10(a) is an upper view thereof and FIG. 10(b) is a sectional view taken along F-F in FIG. 10(a).
Figure 10B:
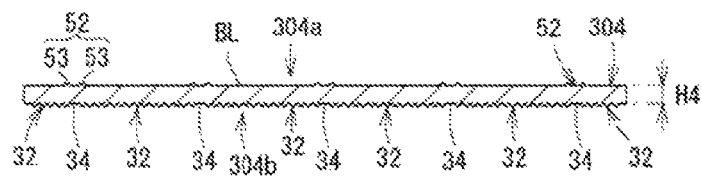

Next, a second modification of the second embodiment described above will be described with reference to FIG. 10. FIG. 10 shows a rolling mat 109 according to a modification of FIG. 9. Only one rib part 304 is shown.

The rolling mat 109 shown in FIG. 10 differs from the rolling mat 106 shown in FIG. 9 in a configuration of a string regulating part 52 on an upper surface 304a. The string regulating part 52 is constituted by a plurality of protruding parts 53 that protrude from the upper surface 304a of the rib part 304. Accordingly, a thickness H4 (a thickness excluding the string regulating part 52) of a reference plane (an approximate area of a primary plane) of the rib part 304 can be reduced as compared to the rib part 301 shown in FIG. 9 while maintaining necessary rigidity.

Specifically, when the rib part 301 shown in FIG. 9 is designed such that a thickness H3 at a flat reference plane excluding a portion corresponding to the string regulating part 29 is similar to H4 shown in FIG. 10, since the groove like string regulating part 29 creates portions with reduced thickness where stress is likely to concentrate as shown in FIG. 9, desired bending rigidity cannot be obtained particularly in the long side direction X. Therefore, since the thickness H3 must be increased as a whole in order to maintain rigidity similar to FIG. 10 with the example shown in FIG. 9, weight increases accordingly and causes workability of the rolling mat to decline. In comparison, with the rib part 304 shown in FIG. 10, since rigidity similar to a design that does not take the string regulating part 52 into consideration can be maintained, the rib part 304 can be formed so that the reference thickness H4 is thinner than the thickness H3 shown in FIG. 9.

Specifically, the rib part 304 shown in FIG. 10 includes a plurality of string regulating parts 52 corresponding to each row of the knitted string part, and each string regulating part 52 is constituted by two rows of protruding parts 53 that protrude along the rolling direction Y with respect to a flat surface BL of the upper surface 304a as a reference surface. A space between the two rows of protruding parts 53 constitute a string path through which the knitted string part 14 (refer to FIG. 1) passes.

The protruding part 53 has a longitudinal cross section shape in a direction X that is perpendicular to the rolling direction Y that is an approximately arc like surface and has a rod shape that is formed elongated in the rolling direction Y.

Moreover, a lower surface 304b has an uneven pattern 32 in a similar manner to FIG. 9, and the uneven pattern 32 is favorably formed by protruding parts that protrude from the flat part 34 as a reference surface (from a bottom part of a recessed part as a reference surface). Accordingly, food material and foreign objects adhered to the flat part 34 can be easily cleaned by raking between the fine protruding patterns. In addition, the uneven pattern 32 prevents bending rigidity of the rib part 304 from declining.

While the rib part 304 shown in FIG. 10 includes a string regulating part constituted by the protruding parts 53 and the uneven pattern 32, the present invention is not limited thereto. For example, the uneven pattern 32 may be omitted from the lower surface 304b and the string regulating part may be solely constituted by the protruding parts 53 on the upper surface 304a. Alternatively, the string regulating part may be constituted by protruding parts 53 formed on both the upper and lower surfaces 304a and 304b.

Third Modification of Second Embodiment

Figure 11A:
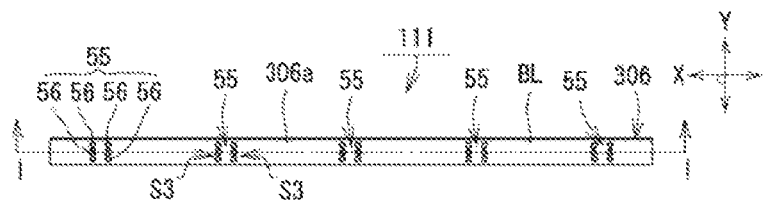
FIG. 11(a) is an upper view thereof and FIG. 11(b) is a sectional view taken along I-I in FIG. 11(a).
Figure 11B:
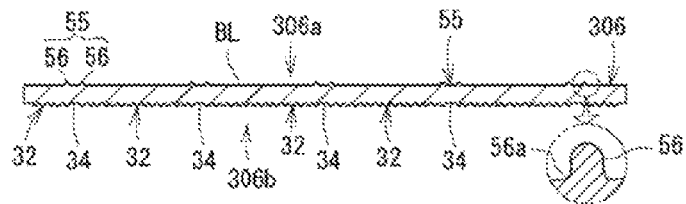

Next, a third modification of the second embodiment described above will be described with reference to FIG. 11. FIG. 11 shows a rolling mat 111 according to a modification of FIG. 10. Only one rib part 306 is shown.

The rolling mat 111 shown in FIG. 11 differs from the rolling mat 109 shown in FIG. 10 in a shape of the protruding parts 56 constituting the string regulating part 55. Specifically, the string regulating part 55 according to the present modification is formed by aligning a plurality of dot like or dome like protruding parts 56 in the rolling direction Y at required intervals S3 in two rows in the long side direction X of the rib part 306.

The protruding part 56 has a longitudinal cross section shape with an approximately arc like surface. In addition, as shown in an enlarged sectional view of the protruding part 56 that is enclosed by a two-dot chain line in FIG. 11(b), a vicinity of a boundary between the protruding part 56 and the flat surface BL (a vicinity of a root 56a of the protruding part 56) is given a skirt shape that does not have sudden variations in shape. Accordingly, even when the protruding parts 56 have a dot shape, rupture of the protruding parts 56 can be prevented. In addition, since intervals S3 provided between adjacent protruding parts 56 enable food material and the like having entered the string regulating part 55 to be readily raked, superior cleaning performance can be realized.

Third Embodiment

Figure 12A:
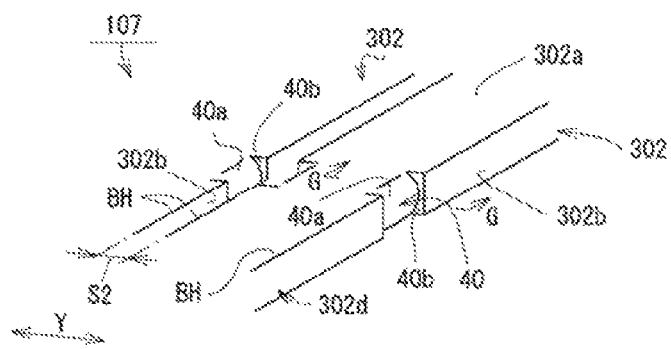
FIG. 12(a) is a partial enlarged perspective view showing a characteristic portion thereof and FIG. 12(b) is a sectional view taken along G-G in FIG. 12(a).

Next, a third embodiment of the present invention will be described with reference to FIG. 12. FIG. 12 shows a rolling mat 107 according to the third embodiment. Only characteristic portions of a rib part is illustrated.

A rib part 302 shown in FIG. 12 mainly differs from the rib parts shown in FIGS. 8 to 11 in a string regulating part for regulating a string path of a knitted string part. Specifically, the string regulating part of the rib part 302 is a recess 40 formed on a boundary BH between upper and lower surfaces 302a and 302d and a side surface 302b in the rolling direction Y of the rib part.

The recess 40 shown in FIG. 12 is formed by creating a groove like part in a thickness direction of the rib part 302 on the side surface 302b that opposes an adjacent rib part 302. The recess 40 that constitutes the string regulating part is only arranged in an area corresponding to a string path through which the knitted string part 14 shown in FIG. 1 is to pass. Accordingly, an inner side surface 40b of the recess 40 shown in FIG. 12 engages the knitted string part and acts as a string regulating part for regulating the string path.

Figure 12B:
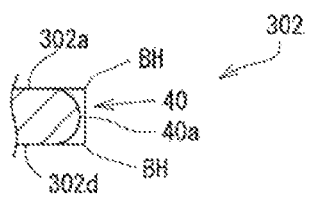

In addition, as shown in FIG. 12(b), a longitudinal cross section shape of the rib part 302 in the rolling direction Y in a portion of the recess 40 is a rounded corner square shape. In the case of FIG. 12, specifically, an inner bottom part 40a of the recess 40 is bent so as to bulge toward a side of the side surface 302b of an adjacent rib part, and a boundary between the inner bottom part 40a and the upper and lower surfaces 302a and 302d is given a rounded corner square shape in a similar manner to the sliding part 27a shown in FIG. 6(c). Accordingly, the knitted string part slides smoothly in the recess 40 and on the upper and lower surfaces 302a and 302d.

Furthermore, with the rib part 302, in areas other than the recess 40, the boundary BH between the upper and lower surfaces 302a and 302d and the side surface 302b is configured as an approximate corner (approximately perpendicular). Accordingly, compared to the rib part shown in FIG. 6 in which corner parts are rounded as a whole, areas of flat portions of the upper and lower surfaces 302a and 302d are increased.

In addition, by forming the groove like recess 40 on the side surface 302b, a string material part (not shown) to constitute the knitted string part can be knitted without being impeded even if an interval S2 between two adjacent rib parts 302 is reduced. As a result, rice grains or the like can be effectively prevented from entering the interval S2. Furthermore, by varying a depth of the recess 40 from the side surface 302b (a formation height of 40b) when forming the recess 40, the interval S2 between rib parts 302 can be changed. Moreover, even if a curved apex of the inner bottom part 40a of the recess 40 is formed to a same height as the side surface 302b, since the inner side surface 40b of the recess 40 can engage in upper and lower portions thereof with the knitted string part, the recess 40 functions as a string regulating part.

An uneven pattern similar to that shown in FIG. 8 and the like may be provided on a lower surface of the rib part 302.

Modification of Third Embodiment

Figure 13A:
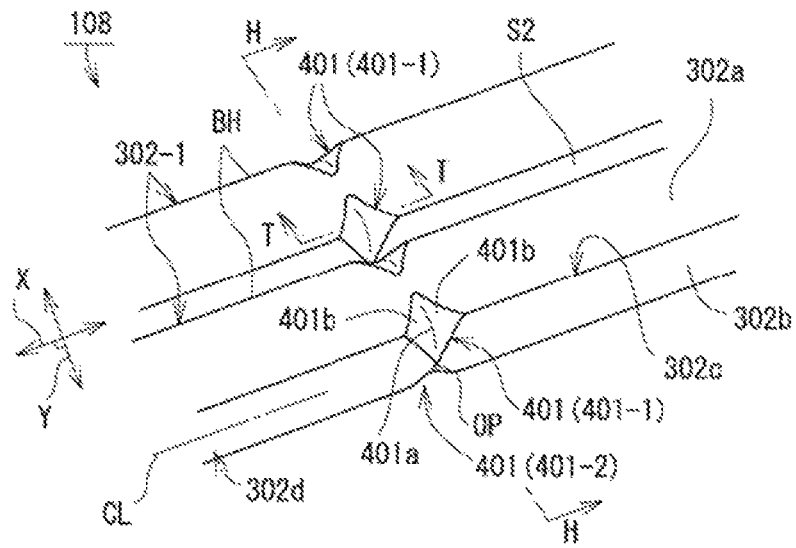
FIG. 13(a) is a partial enlarged perspective view showing a characteristic portion thereof.
Figure 13B:
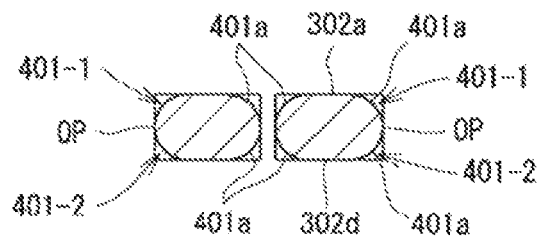
FIG. 13(b) is a sectional view taken along H-H in FIG. 13(a)
Figure 13C:
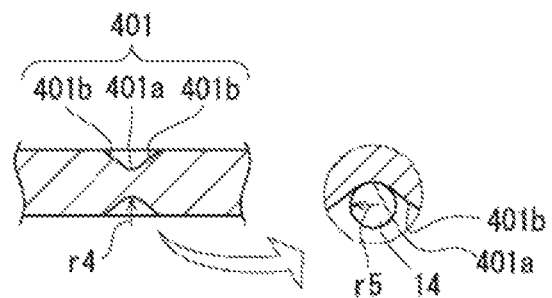
FIG. 13(c) is a sectional view taken along T-T in FIG. 13(a).

Next, a modification of the third embodiment described above will be described with reference to FIG. 13. FIG. 13 shows a rolling mat 108 according to a modification of FIG. 12 and illustrates a characteristic portion of a rib part of the rolling mat 108.

The rolling mat 108 shown in FIG. 13 only differs from the rolling mat 107 shown in FIG. 12 in a configuration of a string regulating part for regulating a string path.

Specifically, while the string regulating part shown in FIG. 13 is a recess 401 that is only formed in an area corresponding to a string path on a boundary (in other words, a corner part) BH between the upper and lower surfaces 302*a* and 302*d* and the side surface 302*b* of the rib part, the recess 401 has an approximately V shaped cross section in the long side direction X of a rib part 302-1 which is a recessing direction. In other words, inner side surfaces 401*b* of the recess 401 are inclined so as to gradually approach each other toward an inner bottom part 401*a*. For example, a longitudinal cross section shape of the rib part 302-1 in the long side direction X in the recess 401 (a T-T cross section in FIG. 13(*a*)) is an approximately V shape as shown in FIG. 13(*c*).

Moreover, a cross section of the inner bottom part 401*a* of the recess 401 in the drawing in the long side direction X of the rib part is not acute and the inner bottom part 401*a* is curved and rounded as shown in a diagram (which also shows the knitted string part 14) enclosed by a two-dot chain line in FIG. 13(*c*) which is an enlarged view of a vicinity of the inner bottom part 401*a*. A curvature radius r4 that forms the roundness of the inner bottom part 401*a* is favorably at least larger than a curvature radius r5 that forms the roundness of the string material part 14 that constitutes the knitted string part 14. Accordingly, the knitted string part 14 slides smoothly in the recess 401.

The recess 401 is not formed in a center part OP of the rib part 302-1 in a thickness direction but is formed as an upper recess 401-1 and a lower recess 401-2 on both upper and lower sides of the center part OP. Shapes of the upper recess 401-1 and the lower recess 401-2 are symmetrical with respect to the center part OP of the rib part 302-1 in the thickness direction.

In addition, as shown in FIG. 13(*b*), a longitudinal cross section shape of the inner bottom part 401*a* of the recess 401 in the rolling direction Y is a rounded corner shape (in the case of the drawings, the upper string regulating part 401-1 is curved diagonally upward and the lower string regulating part 401-2 is curved diagonally downward). Moreover, a cross section of the rib part 302-1 in the rolling direction Y which passes through the inner bottom part 401*a* (an H-H cross section shown in FIG. 13(*a*)) is an approximately ellipsoidal shape.

The string regulating part shown in FIG. 13 is configured as described above and, accordingly, a string path can be regulated so that a knitted string part to pass through the string path is not diverted in a similar manner to the string regulating part shown in FIG. 12. In addition, since the flat areas of the upper and lower surfaces 302*a* and 302*d* are increased as compared to a rib part (refer to FIG. 6) whose longitudinal cross section in the rolling direction Y is an ellipsoidal shape, an oval shape, or the like as a whole, a portion in which food material is pressed can be increased and, at the same time, the possibility of rice grains getting caught in the gap S2 can be reduced.

Furthermore, since the inner side surfaces 401*b* of the recess 401 are inclined so as to approach each other toward the inner bottom part 401*a*, the knitted string part is guided to the inner bottom part 401*a*. As a result, a position of the knitted string part becomes constant and the plurality of rib parts 302 can be neatly arranged.

Moreover, the longitudinal cross section shape of the inner bottom part 401*a* in the rolling direction Y is a rounded corner square shape and a cross section of the rib part in the long side direction X is curved and rounded. Therefore, biting and damage of the knitted string part that passes inside the recess 401 can be prevented.

In addition, since the recess 401 can be made smaller than the recess 40 shown in FIG. 12 and the recess 401 has a smaller portion that bends abruptly, a rib part 302-1 with high bending strength can be formed.

Fourth Embodiment

Next, a fourth embodiment of the present invention will be described with reference to FIG. 14. FIG. 14 shows a rolling mat 112 according to the fourth embodiment and illustrates a characteristic portion thereof.

In a similar manner to the rolling mats shown in FIGS. 1 to 13, the rolling mat 112 shown in FIG. 14 includes a plurality of rib parts 12 lined in the direction Y in which food material is rolled and a knitted string part 14 that connects the plurality of rib parts 12 to each other by knitting a string material part so as to sandwich the rib parts 12.

The rolling mat 112 shown in FIG. 14 differs from the rolling mats 10 and 101 to 108 shown in the respective drawings described earlier in shapes of terminal rib parts 20 and 21.

Specifically, the terminal rib parts 20 and 21 arranged at ends in the rolling direction Y among the plurality of rib parts have an outer recessed part 57 that is recessed inward in the rolling direction Y at a position corresponding to a string path through which the knitted string part 14 (in particular, a knot 16) is to pass on outer end surface parts 20*a* and 21*a* (refer to FIG. 14(*b*)) in the rolling direction Y. The outer recessed part 57 has a depth D4 (refer to FIG. 14(*c*)) capable of housing the knot 16 made by a first string material part 14*a* and a second string material part 14*b* and is recessed inward in the rolling direction Y so as to have an approximately V shape in a top view. Moreover, the outer recessed part 57 shown in FIG. 14 is formed on the terminal rib parts 20 and 21 at both ends.

Accordingly, a folded back portion 14*c* of a single string material part that constitutes the knitted string part 14 of each row and the knot 16 are housed in the outer recessed part 57 and exposure of the folded back portion 14*c* and the knot 16 to the outside can be prevented. Therefore, sanitary performance of the knitted string part 14 can be improved and the frequency of the knitted string part 14 rubbing against other objects can be reduced.

In addition, the outer recessed part 57 also acts as a string regulating part that prevents displacement of the knitted string part 14 on the outer end surface parts 20*a* and 21*a* of the terminal rib parts 20 and 21. In particular, since the outer recessed part 57 shown in FIG. 14 is a V shaped groove, the outer recessed part 57 readily engages with the knitted string part 14 and can reliably prevent displacement.

Furthermore, while the knot 16 and an excess string part 49 are likely to be impediments when performing rolling operations, by providing the outer recessed part 57, the knot 16 can be housed and, at the same time, a length L3 of the excess string part 49 that protrudes from the end surface part 20a can be reduced. As a result, rolling operations can be performed more easily.

Moreover, the present invention is not limited to the embodiment shown in FIG. 14 and an outer recessed part 57 that is formed on one terminal rib part 20 and an outer recessed part 57 that is formed on the other terminal rib part 21 may have different shapes. For example, when a single string material part is folded back to constitute the knitted string part 14 of each row as shown in FIG. 14, the outer recessed part 57 that houses a folded back portion 14c is favorably made smaller than the outer recessed part 57 that houses the knot 16 in order to increase rigidity of the terminal rib part 21 as much as possible.

In addition, while the outer recessed part 57 is formed on the terminal rib parts 20 and 21 at both ends in FIG. 14, the present invention is not limited thereto and the outer recessed part 57 may only be formed on the terminal rib part 20 having the knot 16.

Figure 14A:
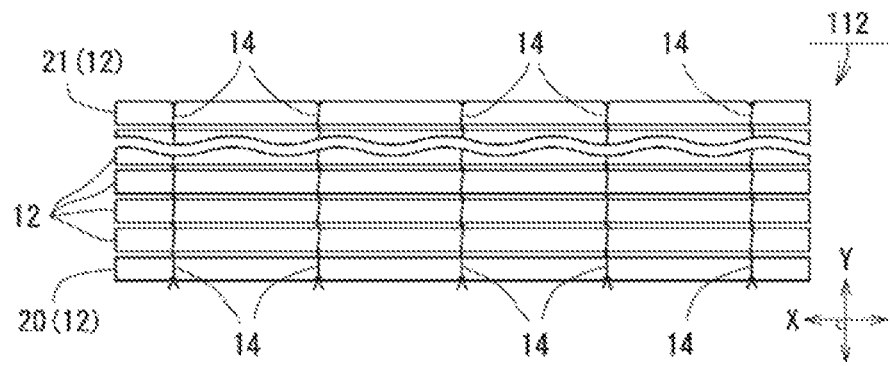
FIG. 14(a) is a partial upper view thereof.
Figure 14B:
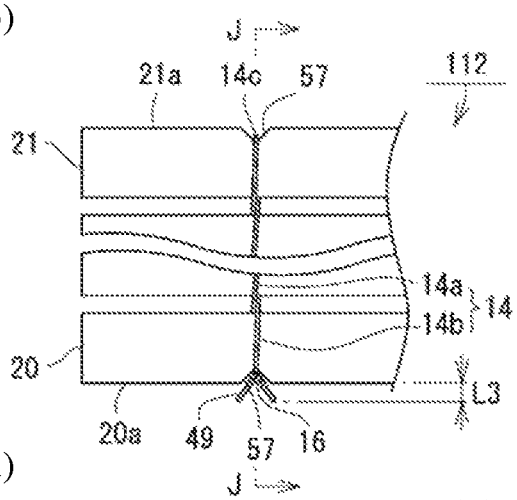
FIG. 14(b) is a partial enlarged view of a periphery of a terminal rib part shown in FIG. 14(a)
Figure 14C:
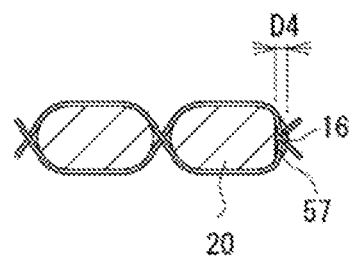
FIG. 14(c) is a longitudinal sectional view of the terminal rib part shown in FIG. 14(b) in a rolling direction.
Figure 14D:
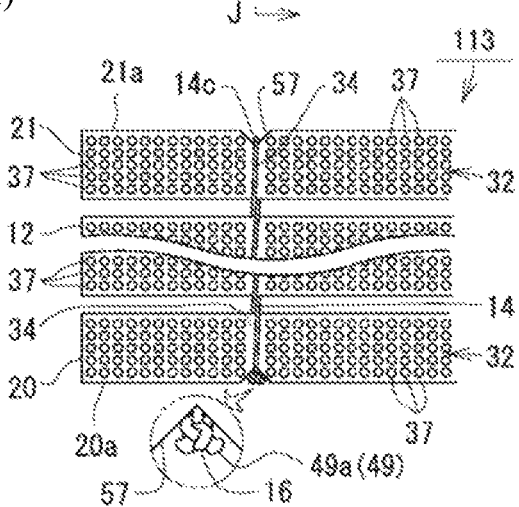
FIG. 14(d) shows a modification of FIG. 14(b)
Figure 14E:
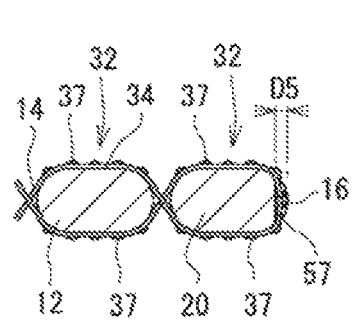
FIG. 14(e) is a longitudinal sectional view of a periphery of the terminal rib part shown in FIG. 14(d) in a rolling direction.

Furthermore, in the present invention, a rolling mat 113 having the characteristics shown in FIGS. 14(d) and 14(e) is more favorably adopted. In FIGS. 14(d) and 14(e), the excess string part 49 ahead of the knot 16 is characteristically cut off. Accordingly, a situation can be prevented where the excess string part 49 comes into contact with a hand when performing an operation to roll food material or the like. In addition, while it is difficult to cut off the entire excess string part 49, since the outer recessed part 57 has a depth D5 that approximately houses the excess string part 49 that remains after being cut, the excess string part 49 after being cut does not come into contact with the hand.

Moreover, the excess string part 49 is cut using means such as heating and melting or flame cutting. Accordingly, a round or spherical part 49a is formed on a cut surface as shown in a diagram enclosed by a two-dot chain line which is an enlarged view of the excess string part 49. Therefore, when the string material part to constitute the knitted string part 14 is particularly monofilament fiber (refer to FIG. 2), a situation where the excess string part 49 comes into contact with a hand as would a thorn can be prevented. In addition, even with a string material part (refer to FIG. 3) in which bundles of high molecular weight polyethylene fiber are made into a braid, fraying of strings at the excess string part 49 can prevented to improve sanitary performance, and a situation there the knot 16 becomes undone can also be prevented.

Moreover, in FIGS. 14(d) and 14(e), the uneven pattern 32 that has already been described is provided on both upper and lower surfaces of the rib parts 12, 20, and 21, and a flat part 34 is provided in an area corresponding to a string path. Accordingly, the flat part 34 and the surrounding uneven pattern 32 constitute a string regulating part.

Fifth Embodiment

Next, a fifth embodiment of the present invention will be described with reference to FIG. 15.

FIG. 15 shows a rolling mat 114 according to a fifth embodiment, which differs from the rolling mats 10 and 101 to 113 shown in the respective drawings described above in a material of a string material part to constitute the knitted string part 14 and in a shape of a terminal rib part 64.

First, regarding the rolling mat 114 shown in FIG. 15, while the monofilament fiber shown in FIG. 2 or a high molecular weight polyethylene fiber created by stretching the high molecular weight polyethylene resin into a fiber shape as shown in FIG. 3 is most favorable as a material of the string material part to constitute the knitted string part 14, these materials are not restrictive and a twisted string made of other chemical fibers such as nylon, polyester, vinylon, rayon, and polypropylene fiber may be used instead.

Specifically, with the rolling mat 114 shown in FIG. 15, end parts (for example, the knot 16 and a periphery thereof, and the excess string part 49 ahead of the knot 16) of the knitted string part 14 are embedded in the terminal rib part 64 that is arranged at an end in the rolling direction Y among the plurality of rib parts 12. Accordingly, the knot 16 and the excess string part 49 are prevented from being completely exposed. Therefore, the rolling mat 114 enables terminal treatment of the knitted string part that is most favorable in terms of sanitary performance and easiness of rolling.

In addition to a case where a single string material part is used folded back as shown in FIG. 15, the terminal rib part 64 described above may be formed at both ends of the rolling mat 114 in the rolling direction when the knitted string part 14 is formed using two string material parts that are separated from each other.

Figure 15A:
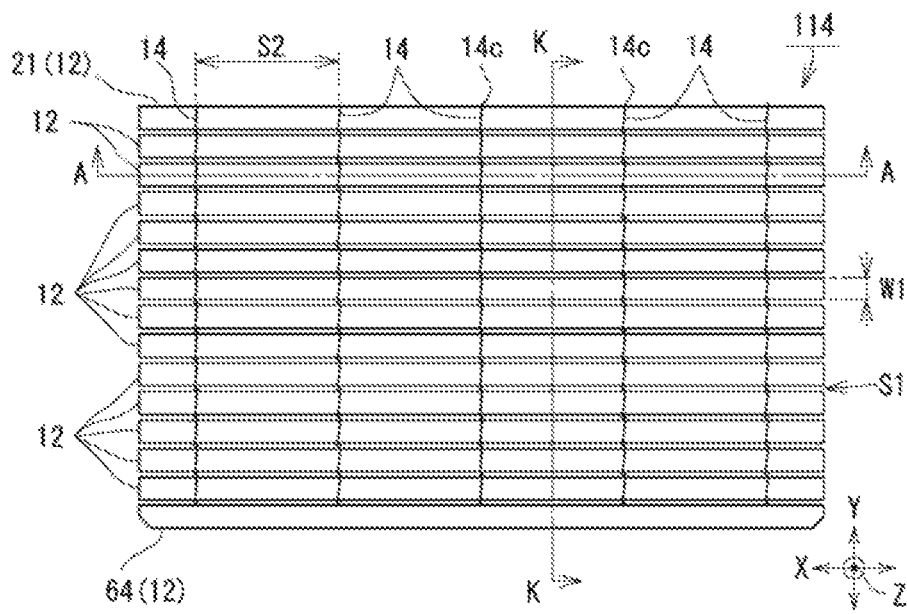
FIG. 15(a) is an upper view thereof.
Figure 15B:
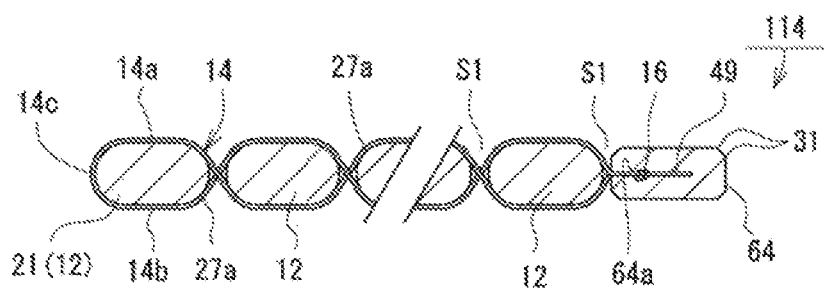
FIG. 15(b) is a sectional view taken along K-K in FIG. 15(a) (intermediate rib parts in the rolling direction have been omitted)

Moreover, in the terminal rib part 64, an outer corner part in the long side direction X is chamfered as shown in FIG. 15(a). In addition, since the knitted string part 14 does not pass a surface of the terminal rib part 64, a corner part 31 is formed on a boundary between upper and lower surfaces and a side surface as shown in FIG. 15(b). Accordingly, slipping when pinching the terminal rib part 64 is prevented. This slippage prevention may be performed by forming shallow recesses on the upper and lower surfaces of the terminal rib part 64.

The terminal rib part 64 described above is made of a plastic material with an initial shape whose longitudinal cross section in the rolling direction Y is an approximately inverted C shape or an approximately U shape or a two-piece plastic material having upper and lower pieces, and after sandwiching an end part of the knitted string part 14 by inner surfaces 64a of the plastic material, the end part of the knitted string part 14 and the inner surfaces 64a are integrated by bonding involving heating and melting or the like. The plastic material may be similar to the plastic materials of the other rib parts 12 or may be a different plastic material.

Figures 15C, 15D:
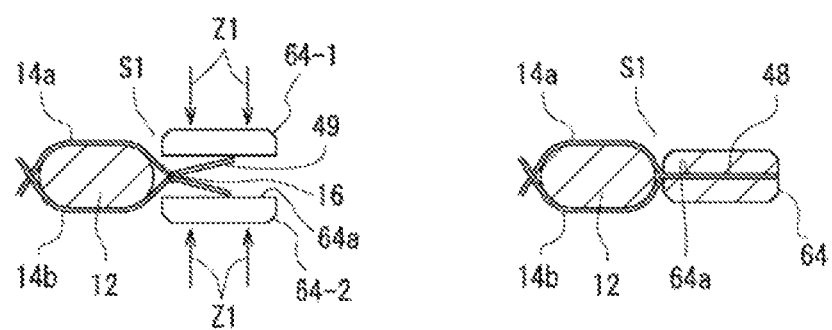
FIG. 15(c) is a diagram illustrating an example of a method of forming a terminal rib part thereof.
FIG. 15(d) is a diagram showing a modification of FIG. 15(b).

Specifically, as shown in FIG. 15(c) which explains a method of manufacturing the rolling mat 114 shown in FIG. 15(a), a first string material part 14a and a second string material part 14b are tied in a knot (in other words, the rolling mat 103 shown in FIG. 6(c) is temporarily formed) on the outside of a gap S1 between the terminal rib part 64 and a adjacent rib part 12 to the inside of the terminal rib part 64. Next, the knot 16 and the excess string part 49 are sandwiched by two plastic terminal materials 64-1 and 64-2 with elongated plate shapes. Then, in order to prevent the end part of the knitted string part 14 from detaching from the terminal rib part 64, the plastic terminal materials 64-1 and 64-2 are pressed and heated by a hot pressing apparatus (not shown) in a direction of Z1 as shown in the drawing so that either the plastic terminal materials themselves are bonded by heating and melting or an adhesive material made of a thermoplastic resin or a thermosetting resin is sandwiched between and bonded together with the plastic terminal materials. In this manner, the knot 16 and the excess string part 49 are embedded between and integrated with the two plastic terminal materials 64-1 and 64-2 to form the terminal rib part 64.

Moreover, while the rolling mat 114 according to the present invention represents an example where an end part of the knitted string part 14 is embedded in the terminal rib part 64, configurations of the end part of the knitted string part 14 are not particularly limited. For example, as shown in FIG. 15(d), the knot 16 made by the first string material part 14a and the second string material part 14*b* may be omitted as shown in FIG. 15(*d*). Specifically, in FIG. 15(*d*), the end part of the knitted string part 14 is left in a state where the string material part is extended without tying the first string material part 14*a* and the second string material part 14*b* into a knot and only an extended string part 48 that is extended is embedded in the terminal rib part 64 by a similar method to that described above. As a result, a tedious operation of forming the knot 16 can be omitted.

While the extended string part 48 may simply involve extending and embedding the first string material part 14*a* and the second string material part 14*b*, the first and second string material parts 14*a* and 14*b* may be embedded in a twisted state or the first and second string material parts 14*a* and 14*b* may be temporarily fixed using an adhesive such as resin or fixed by heating and melting and then embedded by a similar method to that described above. Accordingly, an operation of embedding the end part of the knitted string part 14 can be performed with more ease and loosening or detaching of the knitted string part 14 can be prevented.

In addition, the knot 16 may be formed in plurality or formed in a large size. Furthermore, instead of the knot 16, the first and second string material parts 14*a* and 14*b* may be fixed to each other using an appropriate fixing tool and may be subsequently embedded together with the fixing tool. Alternatively, a large lump part may be formed by heating (both not shown). Accordingly, loosening or detaching of the end part of the knitted string part 14 can be effectively prevented.

Moreover, the end part of the extended string part 48 need not reach an outer end surface of the terminal rib part 64 in the rolling direction Y as shown in FIG. 15(*b*) or may reach an outer end surface of the terminal rib part 64 as shown in FIG. 15(*d*).

First Modification of Fifth Embodiment

Figure 16A:
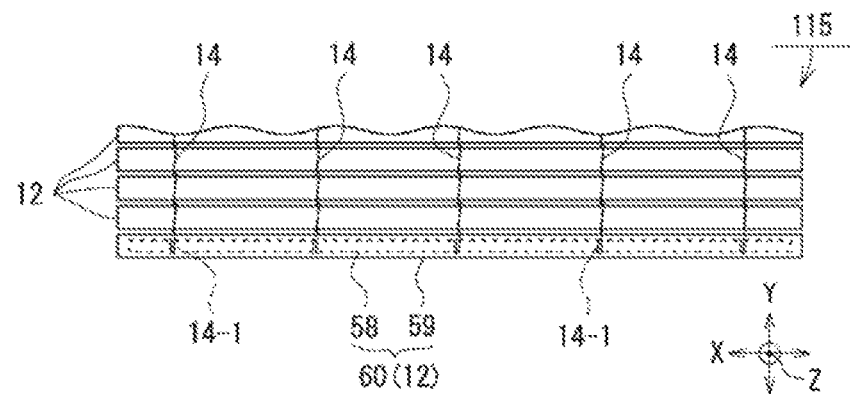
FIG. 16(a) is a partial upper view thereof.
Figure 16B:
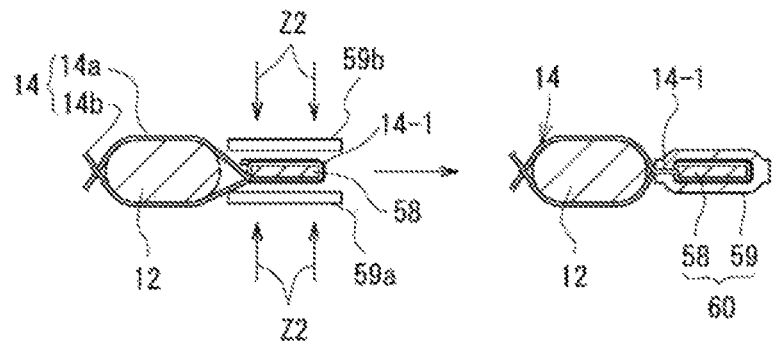
FIG. 16(b) is a diagram illustrating an example of a method of forming a terminal rib part thereof.
Figure 16C:
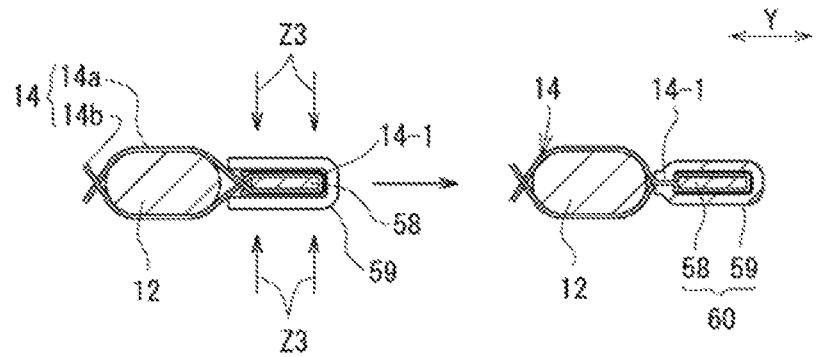
FIG. 16(c) is a diagram illustrating another example of a method of forming the terminal rib part.
Figure 19A:
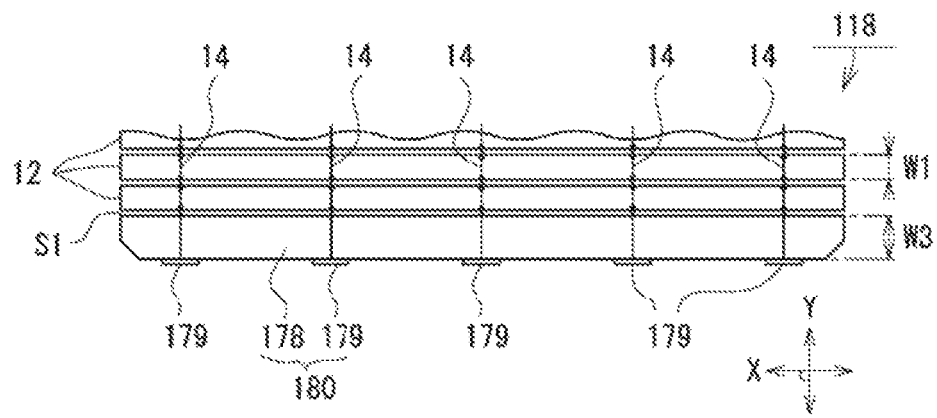
FIG. 19(a) is a partial upper view thereof.
Figure 19B:
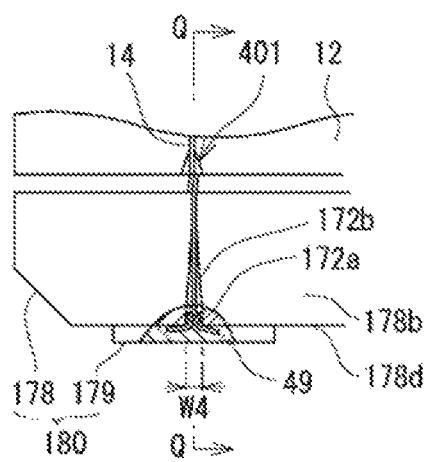
FIG. 19(b) is an enlarged upper view of a periphery of a terminal rib part thereof.
Figure 19C:
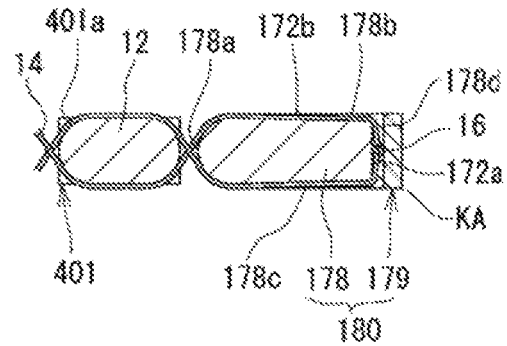
FIG. 19(c) is a sectional view taken along Q-Q in FIG. 19(b)
Figure 19D:
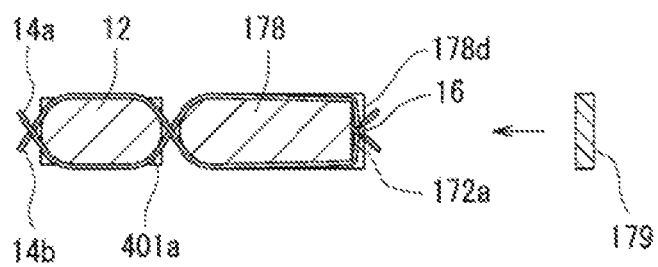
FIG. 19(d) is a diagram illustrating an example of a method of forming a terminal rib part thereof.

Next, a first modification of the fifth embodiment described above will be described with reference to FIG. 16. FIG. 16 shows a rolling mat 115 according to the modification shown in FIG. 15 and illustrates a characteristic portion thereof. Moreover, in order to facilitate understanding, in FIG. 16(*a*), an end part 14-1 of the knitted string part 14 embedded in the inside of the terminal rib part 60 is depicted by a thin solid line.

The rolling mat 115 differs from the rolling mat 114 shown in FIG. 15 in an area of the terminal rib part 60.

Specifically, the terminal rib part 60 is constituted by a core part 58 to which the end part 14-1 of the knitted string part 14 is connected and a cover part 59 that is bonded so as to cover the core part 58. Accordingly, the end part 14-1 of the knitted string part 14 is embedded in and fixed to the terminal rib part 60.

As shown in FIG. 16(*b*) to be described later, the core part 58 shown in FIG. 16 is arranged in a central part of the terminal rib part 60 in a thickness direction Z and the unknotted end part 14-1 of the knitted string part 14 is wound around the core part 58. Accordingly, the end part 14-1 can be fixed inside the terminal rib part 60 and loosening or detaching of the knitted string part 14 can be effectively prevented. In addition, since the end part 14-1 of the knitted string part 14 is not knotted, a tedious operation of forming a knot can be omitted.

While the core part 58 described above may have any length as long as the end part 14-1 of the knitted string part 14 can be fixed by a method such as winding, as shown in FIG. 16 the length of the core part 58 is set approximately equal to the rib part 12 so as to prevent the core part 58 from easily separating from the cover part 59 and to facilitate manufacturing. Since the core part 58 is not exposed to the outside, an arbitrary material such as wood, bamboo, paper, and plastic may be used.

By comparison, since the cover part 59 is exposed to the outside, the cover part 59 is formed of a plastic material. The plastic material may be similar to the other rib parts 12 or may be a different plastic material. The cover part 59 is favorably configured so as to cover the end part of the knitted string part 14 that passes upper and lower surfaces and a side surface of the core part 58 as much as possible to prevent the end part of the knitted string part 14 from detaching. In the case of the drawing, the cover part 59 covers an entire periphery of the core part 58 so that only a path of the knitted string part 14 between adjacent rib parts 12 remains.

Moreover, when the end part 14-1 of the knitted string part 14 is wound around the outer periphery of the core part 58, the end part 14-1 circles the core part 58 at least once or favorably twice or more. Accordingly, the end part 14-1 of the knitted string part 14 can be reliably fixed in the terminal rib part 60. In addition, the end part 14-1 is favorably wound not to overlap in a winding direction so that a gap is not created between the core part 58 and the cover part 59.

Furthermore, when the knitted string part 14 is formed using two string material parts that are completely separated from each other, the terminal rib part 60 may be formed at both ends of the rolling mat 115 in the rolling direction.

The terminal rib part 60 of such a rolling mat 115 is formed as shown in, for example, a left diagram in FIG. 16(*b*). In other words, after sandwiching the rib part 12 that is adjacent to the inside of the terminal rib part 60 by the first string material part 14*a* and the second string material part 14*b*, the end part 14-1 with a long excess portion to the outside of the inside adjacent rib part 12 is wound around the core part 58. The end part 14-1 is wound three times in the drawing. In doing so, the end part 14-1 is wound while being shifted laterally as shown in FIG. 16(*a*) so as to prevent overlapping of the end part 14-1 in the winding direction. Next, the wound core part 58 is sandwiched between upper and lower plastic terminal materials 59*a* and 59*b* with thin plate shapes, and by applying pressure and heat in a direction of an arrow Z2 in the drawing so that melting and bonding is performed in a similar manner to FIG. 15, the end part 14-1 of the knitted string part 14 is treated and the terminal rib part 60 is formed.

Moreover, a method of terminal treatment of the knitted string part 14 and a method of formation of the terminal rib part 60 according to the present invention are not limited to the left diagram in FIG. 16(*b*) and, for example, methods shown in a left diagram in FIG. 16(*c*) may be adopted.

Specifically, in the left diagram in FIG. 16(*c*), a cover part 59 whose longitudinal cross section in the rolling direction Y is a U shape or an inverted C shape is separately prepared. In addition, the core part 58 after being wound by the end part 14-1 is housed in an inside space of the U shape or the like, and pressure and heat are subsequently applied in a direction Z3 which closes the inside space. Accordingly, preparing the cover part 59 that already has a U shape or an inverted C shape makes assembly of the core part 58 and the cover part 59 that much easier and forming of the terminal rib part 60 can be performed in an efficient manner.

Alternatively, as shown in right diagrams in FIGS. 16(*b*) and 16(*c*), two plastic terminal materials molded in advance so as to have deformed cross sections (for example, an I shaped cross section and an L shaped cross section) that resemble the shape of the cover part 59 after being deformed by heating and melting are separately prepared, whereby the plastic terminal materials are bonded and fixed with a suitable adhesive to form the terminal rib part 60.

Moreover, a method of winding and the number of times the end part 14-1 of the knitted string part 14 shown in FIG. 16(*c*) is wound around the core part 58 can be selected as appropriate. In addition, a notched part (not shown) which is bitten into by the first and second string material parts 14*a* and 14*b* and thereby fixes the first and second string material parts 14*a* and 14*b* may be provided on both end surfaces of the core part 58 in the Y direction. Accordingly, the end part 14-1 of the knitted string part 14 is reliably fixed to the core part 58 and loosening or detaching of the knitted string part 14 can be effectively prevented.

Second Modification of Fifth Embodiment

Next, a second modification of the fifth embodiment described above will be described with reference to FIG. 17. FIG. 17 shows a rolling mat 116 according to the modification shown in FIG. 16 and illustrates a characteristic portion thereof. Moreover, in order to facilitate understanding, in FIG. 17(*a*), an end part 14-2 of the knitted string part 14 embedded in the inside of a terminal rib part 70 is depicted by a thin solid line. In addition, in FIG. 17(*b*), a part of a cover part 69 of the terminal rib part 70 has been cut away to show an inner core part 68.

In the present modification, the terminal rib part 70 arranged at an end in the rolling direction Y includes a core part 68 to which the end part 14-2 of the knitted string part 14 is connected and a cover part 69 that is bonded so as to cover the core part 68. The core part 68 has a groove like part 72 in an area where the end part 14-2 of the knitted string part 14 is connected, and the end part 14-2 is housed in the groove like part 72. Therefore, the groove like part 72 regulates movement of the end part 14-2 and reliably fixes the end part 14-2, prevents a gap from being created between the core part 68 and the cover part 69, and ensures that the end part 14-2 is embedded so as not be exposed to the outside.

In the case of FIG. 17, a depth of the groove like part 72 differs according to location. The groove like part 72 is formed such that a depth D2 of a groove like part 72*a* where the knot 16 and the excess string part 49 are arranged is large and a depth D3 of a groove like part 72*b* where only the end part 14-2 of the string material part excluding the knot 16 and the excess string part 49 is arranged is relatively small. In FIG. 17, D2 is a dimension similar to a maximum external shape of the knot 16, and D3 is a dimension similar to an outside diameter of the first and second string material parts 14*a* and 14*b*.

The cover part 69 shown in FIG. 17 is thinly formed to facilitate heating, a longitudinal cross section shape thereof in the rolling direction Y is a U shape or an inverted C shape, and the cover part 69 covers upper and lower surfaces and an outer end surface of the core part 68. A longitudinal cross section shape of the core part 68 in the rolling direction Y is formed slightly smaller than an external shape of the rib parts 12 in a central area, and an external shape of the core part 68 in a direction X that is perpendicular to the rolling direction Y is given an approximately same length as other rib parts 12. In addition, the entire terminal rib part 70 after the core part 68 is covered by the cover part 69 is given an external shape that is similar to that of the rib parts 12.

The end part 14-2 of the knitted string part 14 (a knitted string part outside of the rib part 12 adjacent to and inside of the terminal rib part 70) shown in FIG. 17 includes the knot 16 created by tying the first string material part 14*a* and the second string material part 14*b* and the excess string part 49 ahead of the knot 16 in a similar manner to FIG. 1. While the knot 16 is arranged on an outer end surface of the core part 68, the knot 16 may alternatively be arranged on one of an upper surface and a lower surface of the core part 68. In addition, with the end part 14-2 of the knitted string part 14, after the first and second string material parts 14*a* and 14*b* are wound around the core part 68, the first and second string material parts 14*a* and 14*b* may be tied to the core part 68.

The terminal rib part 70 of such a rolling mat 116 is formed as shown in, for example, FIG. 17(*d*). Specifically, first, the first and second string material parts 14*a* and 14*b* are arranged along the groove like part 72*b* of the core part 68, and the first string material part 14*a* and the second string material part 14*b* are tied in a knot on an inner side of the groove like part 72*a* on the outer end surface of the core part 68. Next, the cover part 69 is placed so as to cover and hide the groove like parts 72*a* and 72*b* and the end part 14-2 of the knitted string part 14, and the cover part 69, the groove like parts 72*a* and 72*b*, and the end part 14-2 of the knitted string part 14 are bonded and integrated with, for example, an adhesive.

Moreover, a string regulating part 55 constituted by a protruding part 56 similar to FIG. 11 is provided on one surface of the rib part 12.

Third Modification of Fifth Embodiment

Next, a third modification of the fifth embodiment described above will be described with reference to FIG. 18. FIG. 18 shows a rolling mat 117 according to the modification shown in FIG. 17 and illustrates a characteristic portion thereof. Moreover, in FIG. 18(*b*), a part of a cover part 79 of a terminal rib part 80 has been cut away in order to facilitate understanding.

While the cover part 69 shown in FIG. 17 covers the upper and lower surfaces and the side surface of the core part 68 as much as possible, the cover part 79 of the rolling mat 117 shown in FIG. 18 covers only an outer end surface 78*d* of the core part 78 so as to embed the knot 16 and a periphery thereof and the excess string part 49 ahead of the knot 16. The cover part 79 is configured so as not to cover an inside end surface 78*a* and upper and lower surfaces 78*b* and 78*c* of the core part 78. Accordingly, when bonding the core part 78 and the cover part 79, a heated molten object, an adhesive, or the like can be prevented from penetrating into a space S1 between the terminal rib part 80 and a rib part 12 adjacent thereto. Therefore, a risk of damaging the knitted string part 14 when removing an extrusion (burr) formed on the inner end surface 78*a* or the like can be removed, and since the cover part 79 need not be bonded so as to be wound around the core part 78, operations are simplified.

If the cover part 79 is arranged across the entire length in the X direction as shown in FIG. 18(*a*) or arranged across the entire length in the X direction with the exception of parts of both ends, a uniform finish and a favorable appearance of the terminal rib part 80 can be realized and, furthermore, operation processes can be reduced. In addition, as shown in FIG. 18(*c*), in the cover part 79, an inner surface 79*a* that opposes the core part 78 corresponds to a shape of the outer end surface 78*d* of the core part 78 and, in the case of the drawings, the inner surface 79*a* is curved so as to be recessed inward. Furthermore, a corner part KA that is approximately right angled is formed on an outer surface of the cover part 79 that is exposed to the outside.

Since the upper and lower surfaces 78*b* and 78*c* and the inner end surface 78*a* of the core part 78 shown in FIG. 18 are exposed to the outside, the core part 78 is favorably formed of a plastic material in a similar manner to the other rib parts 12.

Furthermore, the shape and the like of the core part 78 are favorably configured approximately similar to other central rib parts 12. Accordingly, the core part 78 can be easily manufactured and can be given rigidity that is not inferior to that of other rib parts 12.

As described above, the core part 78 shown in FIG. 18 can be no longer considered a core part and is virtually a rib part that is no different from the other rib parts 12. Therefore, the terminal rib part 80 can be considered comparable to, for example, the terminal rib part 27 shown in FIG. 6(*c*) to which the cover part 79 shown in FIG. 18 is bonded.

In addition, since bonding of the cover part 79 causes the dimension of terminal rib part 80 in the rolling direction Y to be larger than the other rib parts 12, since the terminal rib part 80 is at a position that does not greatly contribute to the usage of the rolling mat, use of the rolling mat is not impeded.

The terminal rib part 80 of such a rolling mat 117 is formed as shown in, for example, FIG. 18(*d*). Specifically, in FIG. 18(*d*), a cover part 79 which has a long rod shape corresponding to the length and thickness (height) of the core part 78 and whose longitudinal cross section shape is curved so as to be recessed inward is prepared in advance.

In addition, the first string material part 14*a* and the second string material part 14*b* are tied at a position of the outer end surface 78*d* of the core part 78 to form the knot 16. Next, after spreading the excess string part 49 in the long side direction X of the core part 78 (refer to FIG. 18(*b*)), the outer end surface 78*d* is covered by the cover part 79 while being pressed in a direction Z4, the outer end surface 78*d* and the cover part 79 are integrated by bonding involving heating and melting or bonding using an adhesive, and an end part of the knitted string part 14 is embedded in the terminal rib part 80.

Moreover, the cover part 79 shown in FIG. 18(*d*) is formed curved in advance so as to conform to a shape of the outer end surface 78*d* of the core part 78. However, for example, when performing bonding by heating and melting, a cover part 79-1 shown in FIG. 18(*e*) whose longitudinal cross section has an approximately rectangular shape and which has a rod shape (flat plate shape) may be used to perform bonding involving heating, melting, and deforming the cover part 79-1 into the shape of the outer end surface 78*d* at the same time as the bonding by heating and melting.

Furthermore, when forming the terminal rib part 80 described above, the excess string part 49 need not necessarily be spread in the long side direction X as shown in FIG. 18(*b*). As a result, the excess string part 49 may not be completely covered by the cover part 79 and a part of the excess string part 49 may be exposed from the terminal rib part 80. In this case, an exposed portion need only be eventually cut and removed. While the end part of the knitted string part is to be embedded as a result, the terminal rib part 80 is favorably formed by cutting and removing the excess string part 49 in advance in a cuttable and removable range.

Moreover, the present invention is not limited to the configuration described above and, for example, besides the core part 78 on which the outer recessed part 57 is formed as shown in FIG. 14, the groove like parts 72*a* and 72*b* shown in FIG. 17 may be formed on the core part 78.

Moreover, a string regulating part constituted by an uneven pattern 32 and a flat part 34 similar to FIG. 8 is provided on one surface of other rib parts 12.

Fourth Modification of Fifth Embodiment

Next, a fourth modification of the fifth embodiment described above will be described with reference to FIG. 19. FIG. 19 shows a rolling mat 118 according to the modification shown in FIG. 18 and illustrates a characteristic portion thereof. Moreover, in FIG. 19(*b*), a part of a cover part 179 of a terminal rib part 180 and the like has been cut away in order to facilitate understanding.

In the present modification, as shown in FIG. 19(*c*), in a core part 178 constituting the terminal rib part 180, an outer end surface 178*d* in the rolling direction Y is formed as an approximately flat surface (however, a groove like part 172*a* is partially included). Specifically, an inner end surface 178*a* of the core part 178 is curved in a protruding shape and the outer end surface 178*d* is formed so as to have a flat surface that is approximately perpendicular to upper and lower surfaces 178*b* and 178*c*. Accordingly, the cover part 179 with a flat plate shape can be favorably adopted. In this case, since the outer end surface 178*d* of the core part 178 is approximately flat, a sheet shape (also referred to as a film shape) can be provided in which thickness of the flat plate cover part 179 is reduced as compared to, for example, the cover part 79-1 shown in FIG. 18(*e*). Therefore, when the cover part 179 is bonded by heating and melting to the outer end surface 178*d* of the core part 178 as shown in FIG. 19(*d*), the bonding by heating and melting can be performed in a short period of time and a risk of damage due to heating of the end part of the knitted string part 14 can be reduced. Moreover, since the cover part 179 shown in FIG. 19 is only arranged in an area corresponding to the knitted string part 14 (specifically, the knot 16 and the excess string part 49) of each row (refer to FIG. 19(*a*)), the influence of the bonding by heating and melting to the core part 178 is also reduced.

In addition, since the outer end surface 178*d* of the core part 178 is an approximately flat surface and the cover part 179 has an approximately flat sheet shape, the bonding between the outer end surface 178*d* and the cover part 179 is a flat adhesion and a bonding operation can be easily performed regardless of the method of bonding.

Furthermore, the core part 178 shown in FIG. 19(*b*) has groove like parts 172*a* and 172*b* for housing end part portions (including the knot 16) of each knitted string part 14. Accordingly, adhesion and bonding between the core part 178 and the cover part 179 can be performed in a flatter manner. In addition, the groove like part 172*b* on the upper and lower surfaces is formed so that a groove width W4 and a groove depth thereof gradually increase from inside to outside in the rolling direction Y. Accordingly, a decline in the strength of the terminal rib part 180 due to the formation of the groove like part 172*b* can be effectively prevented.

In addition, as shown in FIG. 19(*a*), since a dimension (width) W3 of the core part 178 in the rolling direction Y is formed larger than a dimension W1 of other rib parts 12, the terminal rib part 180 can be pinched easily when rolling the rolling mat 118 and the rolling mat 118 can be easily operated. Furthermore, by increasing the width of the terminal rib part 180 (the core part 178) in this manner, a logo, a design, or the like can also be applied to this portion.

Moreover, the core part 178 shown in FIG. 19 is even more exposed to the outside than the core part 78 shown in FIG. 18. Since almost all of the core part 178 is exposed to the outside, the core part 178 can be described as being a rib part rather than a core part. Therefore, the terminal rib part 180 shown in FIG. 19 can be considered equivalent to the cover part 179 being bonded to the terminal rib part 180.

In addition, for the rolling mat 118 shown in FIG. 19, shapes, materials, and the like of the respective embodiments and modifications thereof described earlier can be added and selected as appropriate. For example, when the rolling mat 118 is to be used for a California Roll or the like, the uneven pattern 34 shown in FIGS. 8 to 11 may be formed on the rib parts.

With the rolling mats 114 to 118 illustrated in FIGS. 15 to 19 in which end parts of the knitted string parts are embedded in terminal rib parts, the terminal rib parts 64, 60, 70, 80, and 180 are formed by a different process that is added to a process of connecting and knitting the plurality of rib parts 12 by the knitted string part 14. In addition, since the rolling mat is always used in an area close to an approximately central part in the rolling direction Y among the entire rolling mat, the terminal rib parts arranged at ends of the rolling mat do not necessarily require the same strength such as bending property as the rib parts 12 close to the central part.

In consideration thereof, the terminal rib parts 64, 60, 70, 80, and 180 can be constructed by, for example, a plastic material that differs from the material of the other rib parts 12. For example, for the respective plastic materials that constitute the terminal rib part 64 shown in FIG. 15, the core part 58 and the cover part 59 shown in FIG. 16, and the core parts 68, 78, and 178 and the cover parts 69, 79, and 179 shown in FIGS. 17 to 19, plastic materials having a lower heat resistant temperature (melting point) than the string material part to constitute the knitted string part 14 can be adopted. Accordingly, when heating and melting the plastic materials to embed the end part of the knitted string part into the terminal rib part, the string material part can be prevented from being severed or damaged by melting.

Furthermore, when the end part of the knitted string part is embedded into the terminal rib part using an adhesive material (adhesive) that is a thermoplastic adhesive material, a thermosetting adhesive material, or the like, a plastic material with superior adhesion with the adhesive material is favorably selected as appropriate for the core part and the cover part so as to prevent easy separation and a decline in watertightness.

In addition, the terminal rib parts according to the present invention may be colored differently from the other rib parts. Furthermore, a design pattern may be added to portions of the terminal rib parts. Moreover, such a design pattern can be added at the same time the terminal rib parts are formed. In addition, a shape of the terminal rib parts may differ from other rib parts in dimensions such as length, thickness, and width as well as shape.

The present invention is not limited to the embodiments described above. The respective configurations of the embodiments shown in the respective drawings may be combined with one another, may be omitted, or may be combined with other configurations not illustrated.

Figure 20:
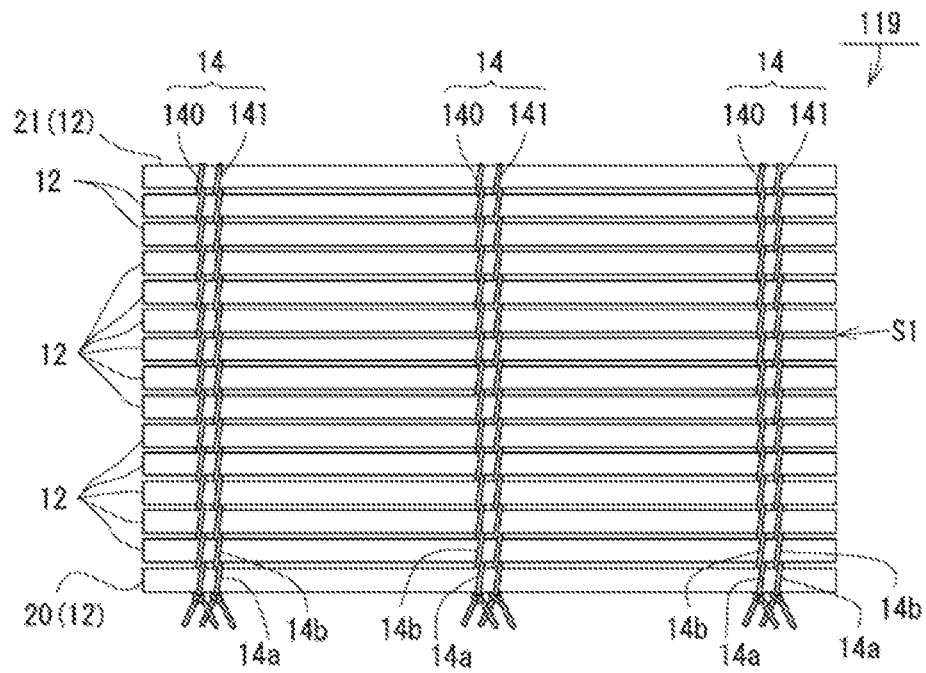
FIG. 20 is an upper view showing another example of the rolling mat according to the first embodiment of the present invention.

For example, as represented by the rolling mat 119 shown in FIG. 20 that is a modification of FIG. 1, the knitted string part 14 of the respective juxtaposed rows may include a plurality of string material parts 140 and 141, and the string material part 140 and the string material part 141 may be arranged close to each other without coming into contact with each other or without being intertwined with each other.

Figure 21:
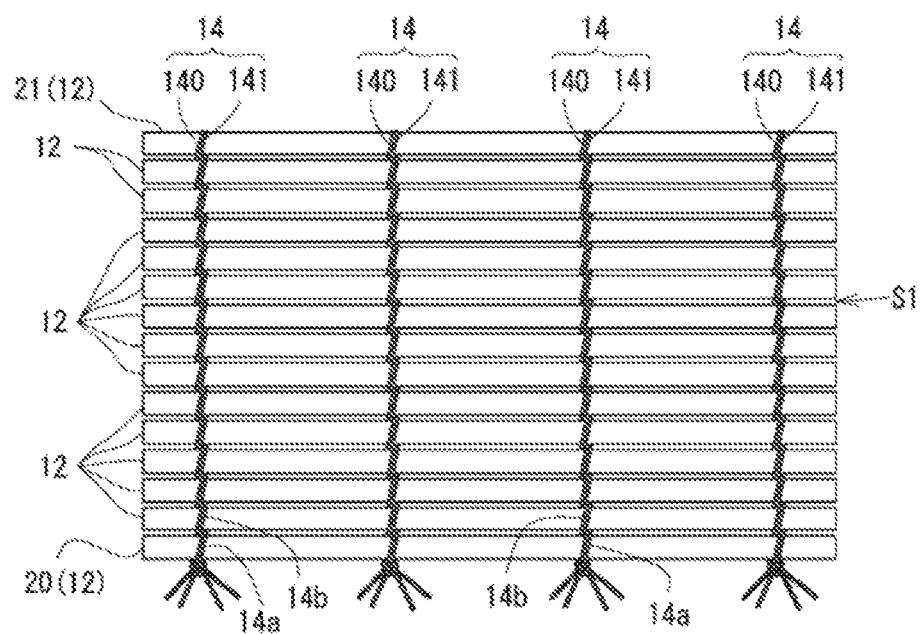
FIG. 21 shows a modification of the rolling mat shown in FIG. 20.

Alternatively, the plurality of string material parts 140 and 141 may be configured so as to be brought into contact with each other without being intertwined as shown in FIG. 21 or may be intertwined.

Moreover, the knitted string part 14 in each row may be constituted by two string material parts 140 and 141 as shown in FIGS. 20 and 21 or may be constituted by three or more string material parts.

According to the examples shown in FIGS. 20 and 21, force acting on a single string material part can be reduced and a risk of breakage can be effectively removed. In addition, in a configuration in which the plurality of string material parts 140 and 141 are brought into contact with or brought close to each other without being intertwined, outer diameters of the string material parts 140 and 141 can be relatively reduced to reduce a gap S1 that is a space between adjacent rib parts 12 in order to reduce a risk of food material penetrating into the gap S1.

Furthermore, with the example shown in FIG. 20, since the plurality of string material parts 140 and 141 that are close to each other are arranged as independent rows of string material parts 140 and 141 without being brought into contact with or intertwined with each other, the risk of stains or moisture penetrating a contact part or a twist seam is removed and sanitary performance can be secured.

Moreover, as the plurality of rod like rib parts, in addition to a rib part whose cross section shape includes both surfaces being approximately parallel to each other, a rib part whose cross section shape is semicircular with one flat surface, and a rib part whose cross section shape is approximately ellipsoidal as shown in the embodiments above, an arbitrary cross section shape such as an approximately circular shape, an approximately trapezoidal shape, and an approximately triangular shape can be adopted. For example, the plurality of rod like rib parts may also be favorably applied to a so-called oni-sumaki (a special rolling mat for making datemaki) for making datemaki eggs which is configured such that rib parts with triangular cross sections are arranged in plurality. In addition, knitted string parts of a rolling mat using rib parts with triangular cross sections may connect the plurality of rib parts by providing through holes in the rib parts in the rolling direction and knitting the rib parts by passing the string material parts through such through holes.

EXPLANATION OF REFERENCE NUMERALS 10, 101 to 119 Rolling mat
12, 25 to 28, 30, 301 to 306 Rib part
14 Knitted string part
14a First string material part
14b Second string material part
16 Knot
49 Excess string part
25a, 26a, 27a, 28a Sliding part
29, 40, 52, 55, 401 String regulating part
32 Uneven pattern
34 Flat part
20, 21, 60, 64, 70, 80, 180 Terminal rib part
57 Outer recessed part
90, 91 String material part

The invention claimed is:
1. A rolling mat comprising:
a plurality of rod-like rib parts that are arranged in a direction in which food material is rolled; and
a knitted string part that connects the plurality of rib parts with each other by knitting a string material part so as to sandwich the rib parts, wherein
the rib parts are formed of a plastic material and/or a metal material having hardness that is at least greater than silicone resin,
the knitted string part is made of man-made monofilament fiber or high molecular weight polyethylene fiber produced by stretching polyethylene resin having a high molecular weight into fibers, and
the rib parts include a string regulating part for regulating a string path through which the knitted string part passes by engaging with the knitted string part on a surface of the rib parts.

2. The rolling mat according to claim 1, wherein the string regulating part is formed on an upper surface and/or a lower surface of the rib parts.

3. The rolling mat according to claim 2, wherein the string regulating part has a groove shape formed along a short side direction of the rib parts.

4. The rolling mat according to claim 2, wherein the string regulating part is a protruding part that protrudes from the surface of the rib parts.

5. The rolling mat according to claim 2, wherein the string path is a flat part, and the string regulating part is formed by having a fine uneven pattern arranged around the flat part.

6. The rolling mat according to claim 1, wherein the string regulating part is a recess formed on a boundary between the upper and lower surfaces and the side surface in the rolling direction of the rib parts, and a longitudinal cross section shape of the recess in the rolling direction is a rounded corner square shape.

7. The rolling mat according to claim 6, wherein the recess has an approximately V shaped cross section in a recessing direction, which is the long side direction of the rib parts.

8. The rolling mat according to claim 1, wherein the string regulating part is a groove shape formed on side surfaces of the plurality of rib parts that are adjacent to each other along a thickness direction of the rib parts.

9. The rolling mat according to claim 1, wherein in a terminal rib part that is arranged at an end in the rolling direction among the plurality of rib parts, an outer end surface part in the rolling direction has an outer recessed part that is recessed inward in the rolling direction, and the outer recessed part is used as the string regulating part.

10. The rolling mat according to claim 9, wherein the knitted string part is constituted by a first string material part and a second string material part that are separated from one another in an area where the rib parts are sandwiched, and the first string material part and the second string material part are tied in a knot at a position of the outer recessed part.

11. The rolling mat according to claim 10, wherein an excess string part ahead of the tied knot is cut, and a round or spherical part is formed on the cut surface.

12. The rolling mat according to claim 1, wherein an end part of the knitted string part is embedded in a terminal rib part that is arranged at an end in the rolling direction among the plurality of rib parts.

13. A rolling mat comprising:
a plurality of rod-like rib parts arranged in a direction in which food material is rolled; and
a knitted string part that connects the plurality of rib parts with each other by knitting a string material part so as to sandwich the rib parts, wherein
the rib parts are formed of a plastic material and/or a metal material having hardness that is at least greater than silicone resin,
the knitted string part is made of man-made monofilament fiber or high molecular weight polyethylene fiber produced by stretching polyethylene resin having a high molecular weight into fibers, and
an end part of the knitted string part is embedded in a terminal rib part that is arranged at an end in the rolling direction among the plurality of rib parts.

14. The rolling mat according to claim 12, wherein the terminal rib part is formed by sandwiching an end part of the knitted string part between plastic materials and bonding and integrating the end part of the knitted string part and the plastic materials so as to embed the end part of the knitted string part.

15. The rolling mat according to claim 13, wherein the terminal rib part is formed by sandwiching an end part of the knitted string part between plastic materials and bonding and integrating the end part of the knitted string part and the plastic materials so as to embed the end part of the knitted string part.

16. The rolling mat according to claim 12, wherein the terminal rib part comprises a core part to which an end part of the knitted string part is connected and a cover part that is bonded so as to cover the core part.

17. The rolling mat according to claim 13, wherein the terminal rib part comprises a core part to which an end part of the knitted string part is connected and a cover part that is bonded so as to cover the core part.

18. The rolling mat according to claim 16, wherein
the knitted string part is constituted by first and second string material parts in an area where upper and lower surfaces of the rib part are sandwiched, the first string material part and the second string material part are tied in a knot at a position of an outer end surface of the core part in the rolling direction, and
the cover part covers the outer end surface of the core part to embed the tied knot and an excess string part ahead of the knot.

19. The rolling mat according to claim 18, wherein the outer end surface of the core part is an approximately flat surface.

20. The rolling mat according to claim 1, wherein the string material part is made of ultrahigh molecular weight polyethylene fiber produced by super stretching ultrahigh molecular weight polyethylene resin having a long molecular chain structure to realize a state where the molecular chain structure is fully stretched, and a fiber direction of the ultrahigh molecular weight polyethylene fiber is arranged approximately along the rolling direction as a whole.

21. The rolling mat according to claim 13, wherein the string material part is made of ultrahigh molecular weight polyethylene fiber produced by super stretching ultrahigh molecular weight polyethylene resin having a long molecular chain structure to realize a state where the molecular chain structure is fully stretched, and a fiber direction of the ultrahigh molecular weight polyethylene fiber is arranged approximately along the rolling direction as a whole.

22. The rolling mat according to claim 20, wherein the string material part is a braid formed by knitting a plurality of bundles of the ultrahigh molecular weight polyethylene fiber in a braid like shape so that the bundles diagonally intersect each other with respect to the rolling direction.

23. A rolling mat comprising:
a plurality of rod-like rib parts arranged in a direction in which food material is rolled; and
a knitted string part that connects the plurality of rib parts with each other by knitting a string material part so as to sandwich the rib parts, wherein
the rib parts are formed of a plastic material and/or a metal material having hardness that is at least greater than silicone resin,
the knitted string part is constituted by first and second string material parts in an area where an upper surface and a lower surface of the rib parts are sandwiched, and the string material parts are knitted so as to intersect each other between the rib parts,
the first and second string material parts are made of ultrahigh molecular weight polyethylene fiber produced by super stretching ultrahigh molecular weight polyethylene resin having a long molecular chain structure to realize a state where the molecular chain structure is fully stretched, and each of the first and second string material parts is a braid formed by knitting a plurality of bundles of the ultrahigh molecular weight polyethylene fiber so that the bundles diagonally intersect each other with respect to the rolling direction and, at the same time, each of the first and second string material parts is oriented such that a fiber direction of the ultrahigh molecular weight polyethylene fiber is arranged approximately along the rolling direction as a whole.

24. The rolling mat according to claim 22, wherein the braid is formed by knitting three or more bundles of the ultrahigh molecular weight polyethylene fibers, and the braid is a round braid with a circular cross section.

25. The rolling mat according to claim 23, wherein the braid is formed by knitting three or more bundles of the ultrahigh molecular weight polyethylene fibers, and the braid is a round braid with a circular cross section.

26. The rolling mat according to claim 1, wherein the knitted string part is arranged in a plurality of rows and the knitted string part in each row includes a plurality of string material parts.

27. The rolling mat according to claim 13, wherein the knitted string part is arranged in a plurality of rows and the knitted string part in each row includes a plurality of string material parts.

28. The rolling mat according to claim 23, wherein the knitted string part is arranged in a plurality of rows and the knitted string part in each row includes a plurality of string material parts.

* * * * *